United States Patent
Schoonover

(10) Patent No.: US 11,928,750 B2
(45) Date of Patent: *Mar. 12, 2024

(54) SYSTEM AND METHOD FOR MONITORING PHYSICAL INFRASTRUCTURE DURING OR IMMEDIATELY FOLLOWING A NATURAL HAZARD EVENT

(71) Applicant: ONE Gas, Inc., Tulsa, OK (US)

(72) Inventor: Colin D. Schoonover, Tulsa, OK (US)

(73) Assignee: ONE Gas, Inc., Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/856,519

(22) Filed: Jul. 1, 2022

(65) Prior Publication Data

US 2022/0405873 A1 Dec. 22, 2022

Related U.S. Application Data

(63) Continuation of application No. 16/471,856, filed as application No. PCT/US2017/068133 on Dec. 22, 2017, now Pat. No. 11,379,940.

(60) Provisional application No. 62/437,750, filed on Dec. 22, 2016.

(51) Int. Cl.
*G06Q 10/10* (2023.01)
*G06F 16/248* (2019.01)
*G06F 16/25* (2019.01)
*G06Q 10/06* (2023.01)
*G06Q 30/02* (2023.01)
*G06Q 30/06* (2023.01)
*G06Q 40/08* (2012.01)
*G06Q 50/26* (2012.01)

(52) U.S. Cl.
CPC ......... *G06Q 50/265* (2013.01); *G06F 16/248* (2019.01); *G06F 16/252* (2019.01)

(58) Field of Classification Search
CPC .... G06Q 50/265; G06Q 50/06; G06F 16/248; G06F 16/252
USPC .......................................... 705/1.1–912, 325
See application file for complete search history.

(56) References Cited

U.S. PATENT DOCUMENTS

| | | |
|---|---|---|
| 2006/0047543 A1 | 3/2006 | Moses |
| 2007/0136077 A1 | 6/2007 | Hammond et al. |
| 2011/0131230 A1 | 6/2011 | Nyman |

(Continued)

FOREIGN PATENT DOCUMENTS

WO      2014070446 A2    5/2014

*Primary Examiner* — Jonathan P Ouellette
(74) *Attorney, Agent, or Firm* — GableGotwals

(57) ABSTRACT

A system (10) and method of this disclosure identifies and prioritizes utility services infrastructure assets and other structures located within a selected service territory that may be potentially impacted by a natural hazard event. The method dynamically displays a map on a graphical user interface, the map containing virtual representations of the utility services infrastructure assets, the non-utility services structures, and a magnitude of the natural hazard event in relation to those assets and structures. Using one of more predetermined rules, a prioritized list of the utility services infrastructure assets that should be inspected within the selected service territory may be dynamically generated. The predetermined rules may include a likelihood of damage and a consequence severity such as, but not limited to, effect on service or public health or safety. Users may be automatically notified when a magnitude of the event is at least as great as a predetermined threshold.

12 Claims, 31 Drawing Sheets

(56) References Cited

U.S. PATENT DOCUMENTS

| | | |
|---|---|---|
| 2011/0218828 A1 | 9/2011 | Mathai et al. |
| 2016/0048938 A1 | 2/2016 | Jones et al. |
| 2017/0251347 A1 | 8/2017 | Mehta et al. |

FIG. 5

SEISMIC ACTIVITY RESPONSE GUIDE

| ACTION | MAGNITUDE | | | | | | | |
|---|---|---|---|---|---|---|---|---|
| | 2.9 or less | 3.0-3.4 | 3.5-3.9 | 4.0-4.4 | 4.5-4.9 | 5.0-5.4 | 5.5-5.9 | 6.0 or greater |
| No action | x | | | | | | | |
| Monitor Media and Call Center activity | | x | x | x | x | x | x | x |
| Patrol schools, hospitals, business districts, and/or other special occupancy sites. Consider communicating with public officials. | | | | | x | x | x | x |
| Conduct Division Engineering assessments of overhead crossings/structure | | | | | | x | x | x |
| Mobilize personnel to leak survey affected areas using RMLD, FI or other company approved survey instruments | | | | | | | x | x |
| Consider mutual assistance | | | | | | | | x |

SYSTEM AND METHOD FOR MONITORING PHYSICAL INFRASTRUCTURE DURING OR IMMEDIATELY FOLLOWING A NATURAL HAZARD EVENT

BACKGROUND

This disclosure relates generally to emergency monitoring. More particularly, the disclosure relates to systems designed to monitor physical infrastructure during or immediately following a natural hazard event.

Physical infrastructure includes structures such as bridges, dams, roads, and rail systems; phone lines and cellphone towers; electrical power generating facilities, transformer stations, and transmission lines; and oil and gas production, treatment or refinery, and distribution systems. These structures can be compromised or damaged by natural hazard events such as earthquakes, flooding, hail- or thunderstorms, tornadoes, ice- or snowstorms, and wildfires.

When these natural events occur, persons responsible for the integrity of the structure need to be notified as to the intensity or magnitude of the event, the likelihood and extent of potential damage, and locations that may be in need of immediate inspection (and possible shutdown or repair).

SUMMARY

A preferred embodiment of the system and method includes computer hardware and associated software that queries near real time or real time natural hazard event data from government or publicly available data bases; decides—based on the severity of the event and its geographic reach—whether one or more of physical structures of interest lie within the event's geographic reach and whether notification is required; automatically notifies personnel tasked with ensuring the integrity of those structures; allows notified personnel to overlay one or more event data maps on top of one or more company-specific or public physical infrastructure data maps; allows personnel to enlarge the resulting overlaid map and perform analysis; and assists personnel when deciding where inspection efforts should be prioritized. The selected event and infrastructure maps are dynamically displayed within a predetermined area of the graphical user interface. A user may then navigate to portions of the map and identify select items on the map.

BRIEF DESCRIPTION OF THE DRAWINGS

FIG. 4A is a navigation menu.
FIG. 4B is a data sources menu.
FIG. 4C is a custom tools menu.
FIG. 4D is a tasks menu.
FIG. 4E is an analysis menu.

FIG. 5 is an example response guide implemented by the system and method in response to seismic activity.

FIG. 6 is an embodiment of a map layers menu.
FIG. 7 is an embodiment of an expanded seismic data layers menu.
FIG. 8 is an embodiment of an expanded institutions layers menu.
FIG. 9 is an embodiment of an expanded land base layers menu.
FIG. 10 is an embodiment of an expanded map grids layers menu.
FIG. 11 is an embodiment of an expanded distribution system by materials layers menu.
FIG. 12 is an embodiment of an expanded transmission facilities menu.
FIG. 13 is an embodiment of an expanded base maps menu.

ELEMENTS AND NUMBERING USED IN THE DRAWINGS AND DETAILED DESCRIPTION

Figure 1:
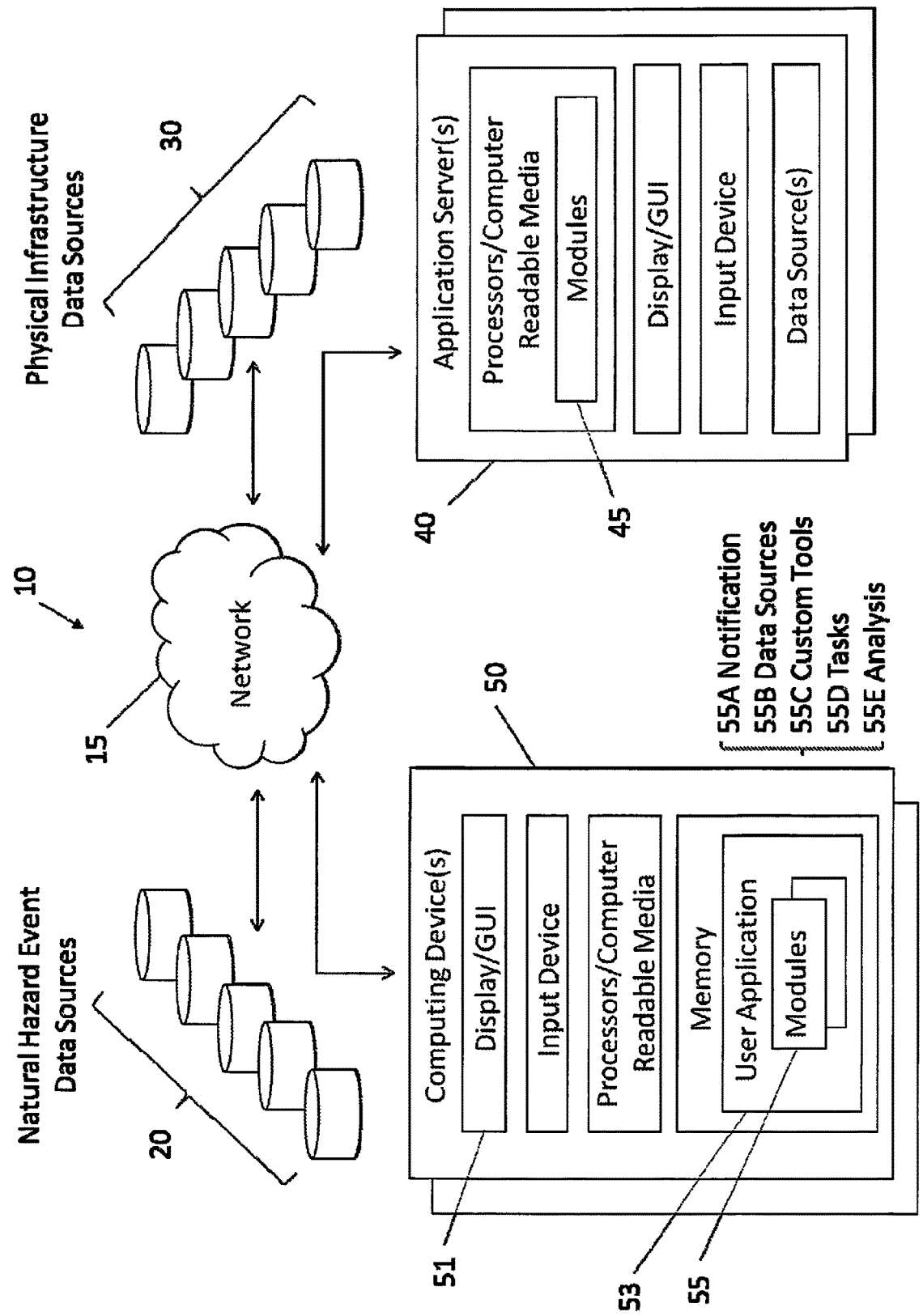
FIG. 1 is a schematic of an embodiment of the system and method.

10 Emergency monitoring system and method
20 Natural hazard event data sources
25 Natural hazard event map layers
30 Physical infrastructure data sources
35 Physical infrastructure map layers
40 Application server(s)
45 Server application modules (generally corresponding to 55)
50 Computing device(s)
51 User interface
55 User application modules (generally corresponding to 45)
A Area affected by event or area of interest or concern
M Map or map overlays (combination of 25 and 35)
T Service territory or territories
V Velocity (or shake) map

SUMMARY

A system and method of this disclosure identifies and prioritizes utility services infrastructure assets and other structures located within a selected service territory that may be potentially impacted by a natural hazard event. The method, which is executed by a microprocessor having software with executable instructions, may dynamically display on a graphical user interface a list of natural hazards that include seismic-related natural hazard events and weather-related natural hazard events. In some embodiments, the method dynamically generates user-defined lines on the map which define a polygonal-shaped area of interest within the selected service territory. That area of interest is then dynamically displayed.

In embodiments, the method queries a first and a second data base over a network. The first data base contains natural hazard event information corresponding to a selected natural hazard and service territory. The second data base containing utility services infrastructure assets information for the selected service territory. In some embodiments, the system and method include querying, over the network, a database that contains non-utility services structures located within the selected service territory. The queried information is then dynamically displayed on a graphical user interface as a map of the selected service territory, the map containing virtual representations of the utility services infrastructure assets, the non-utility services structures, and a magnitude of the natural hazard event in relation to those assets and structures.

Using one of more predetermined rules, a prioritized list of the utility services infrastructure assets that should be inspected within the selected service territory may be dynamically generated. The one or more predetermined rules may include a likelihood of damage and a consequence severity such as, but not limited to, effect on service or public health or safety.

In some embodiments, the method electronically notifies, over the network, a predetermined list of users corresponding to the selected service territory, the notifying occurring when a magnitude of the selected natural hazard event is at least as great as a predetermined magnitude threshold. The magnitude may be an absolute or relative magnitude or intensity, and its virtual representation on the map may include or be presented as a colored or shaded icon or a gradient having different colors or degrees of shading.

DETAILED DESCRIPTION

Figure 2:
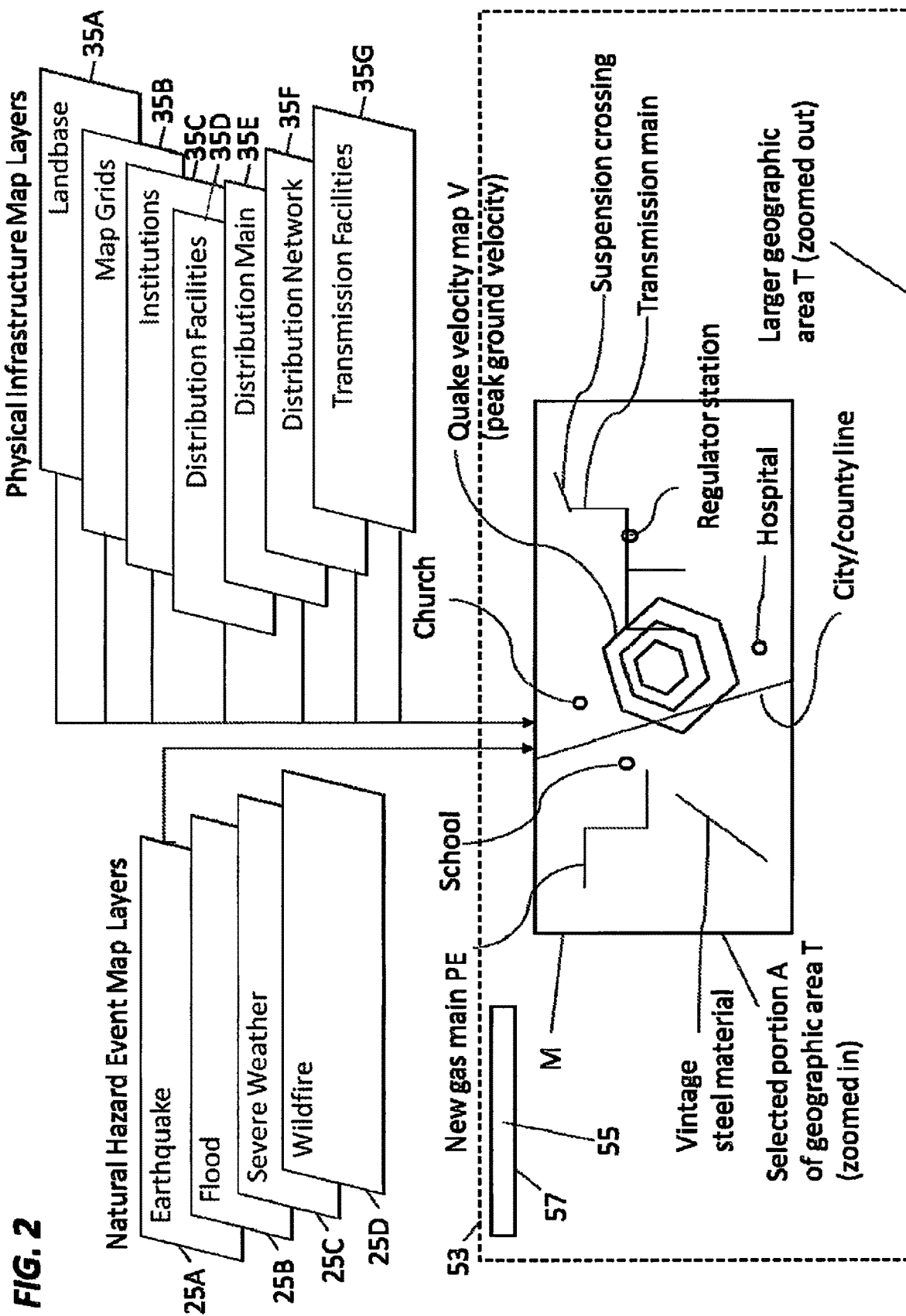
FIG. 2 is a schematic of a user-defined map that includes one or more natural hazard event map layers and one or more user-selected physical infrastructure map layers.

Referring to FIGS. 1 & 2, an emergency monitoring system and method 10 makes use of hardware and associated software 40, 50 connected via a network 15 to one or more natural hazard event data sources 20 and physical infrastructure data sources 30. When a natural hazard event occurs, a notification module 45A determines what service territory or territories "T" are affected and checks whether the hazard event meets a predetermined threshold or criterion. If the threshold is met, appropriate personnel within the service territory T are immediately notified. Notified personnel may include public officials in addition to private company managers, engineers, technicians, and inspection crews. The notification may occur via some combination of email, text message, or voice message.

The notified personnel then use a computing device 50—such as a desk- or laptop computer, tablet, phablet, or mobile phone—to access a graphical user interface 51 that permits the personnel to navigate the service territory T, visually see, or use instrumentation of, an indication of the event's absolute or relative magnitude within the territory T, select additional event data sources 20 and physical infrastructure data sources 30 to produce custom views and map overlays "M", and conduct an analysis to prioritize inspection efforts. As the personnel navigate the service territory T, and as they select data sources 20, 30, the graphical user interface 51 is dynamically updated.

Using a gas distribution company pipeline and an earthquake event as an example, system and method 10 permits users to:
create a buffer zone (polygonal-shaped area of concern or area of interest);
assess facilities and geographic areas of population within the buffer zone;
perform detailed assessment and, if necessary, remedial action plans; and
create various reports which can be stored for archival and audit needs as well as distribution via email or printer to key personnel.

Detailed assessment may include:
identification of public building or institution locations for patrol or contact with local representatives;
assessment of key pipeline facilities to determine if leak survey is needed and, if so, prioritization of which facilities to survey first, second, and so on;
summary inventory of mainline pipe faculties in polygon-shaped areas within the buffer zone by pipe size, type, and footage; and
summary inventory of service line facilities in polygon-shaped areas within the buffer zone by address and pipe footage (which can be used to notify the public, for evacuation, and tracking of contacts made).

Figure 3:
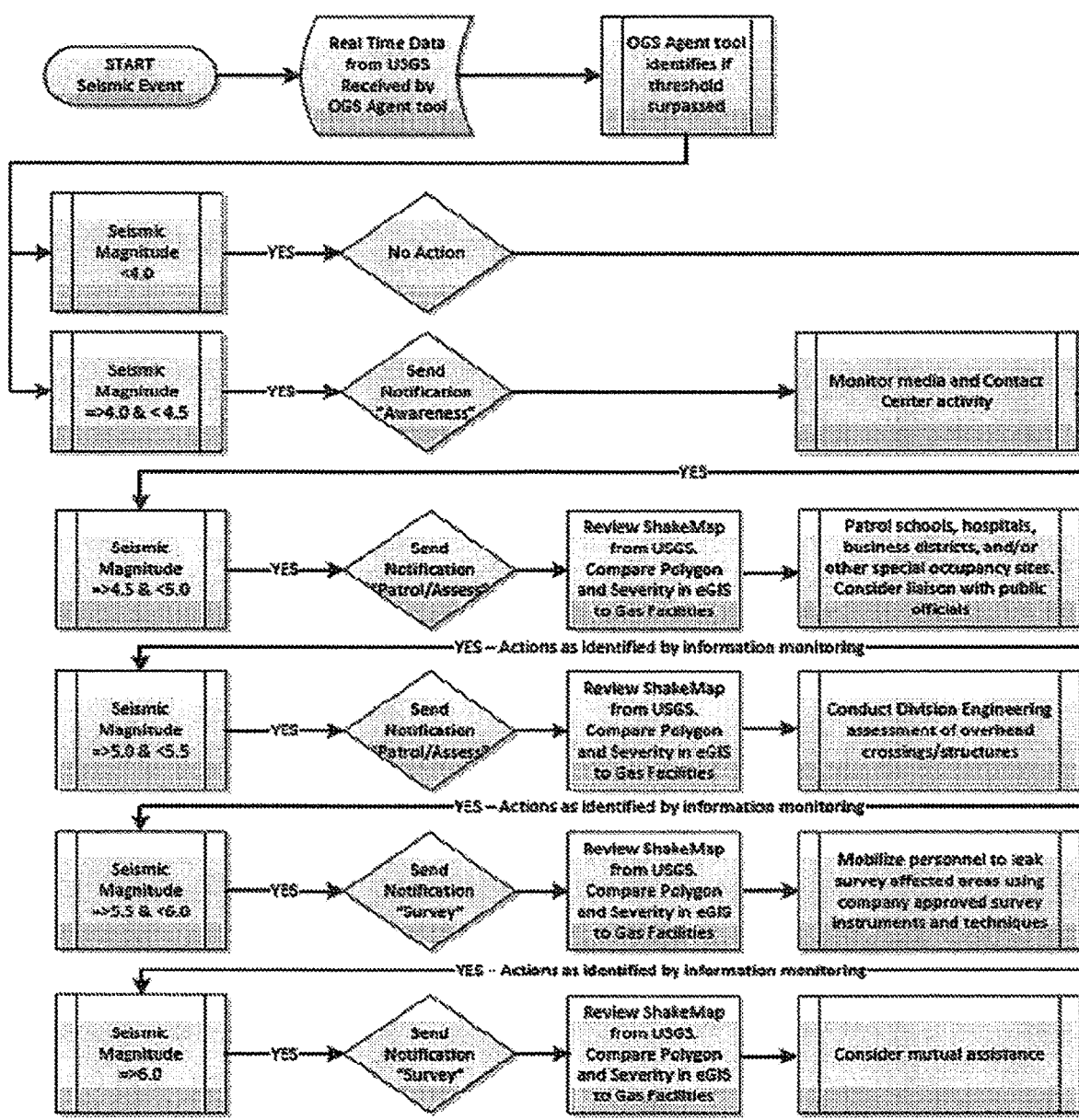
FIG. 3 is an example event workflow implemented by the system and method during or following a seismic event.
Figure 3:
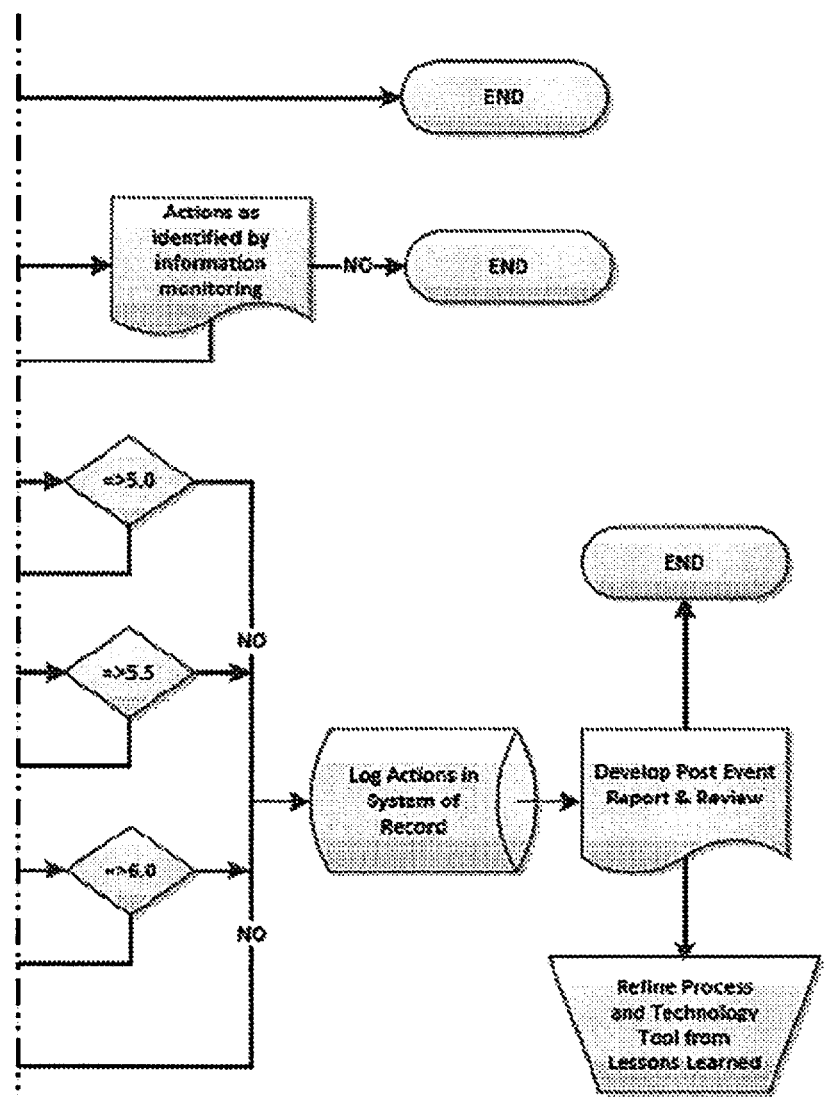
Figure 4A:
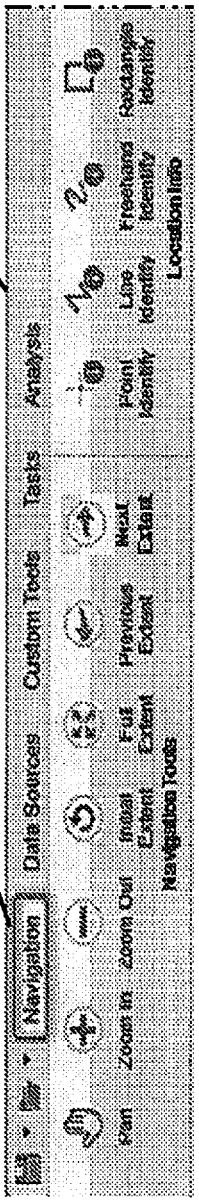
FIGS. 4A-4E are screen shots of example ribbon menus that provide a user access to various modules of the application.
Figure 4A:
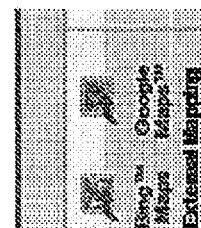
Figure 4B:
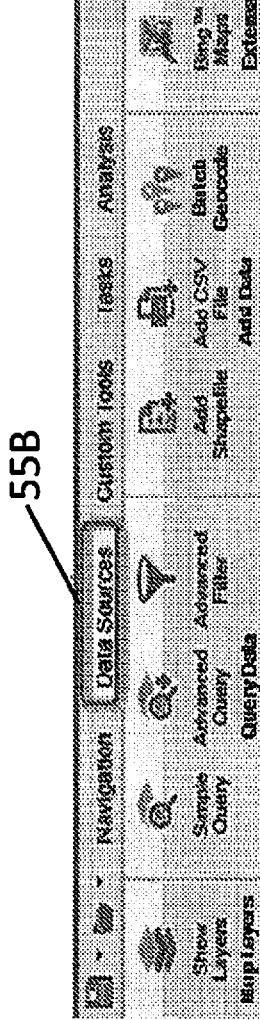
Figure 4C:
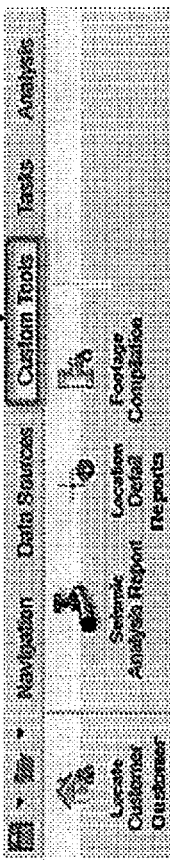
Figure 4D:
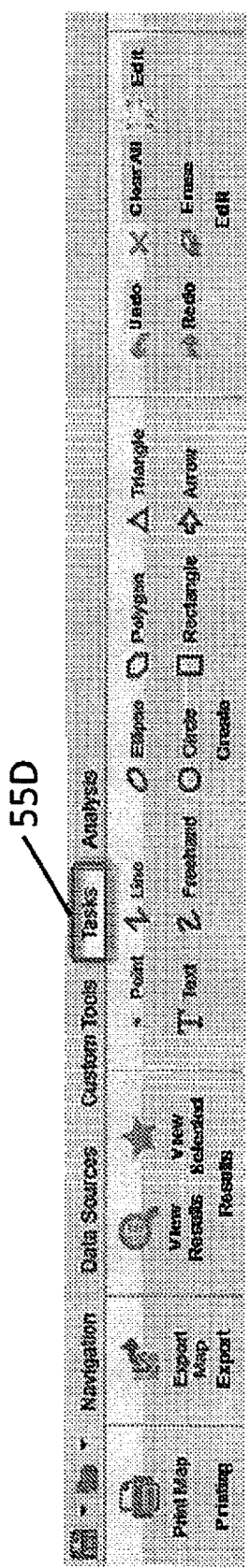
Figure 4E:
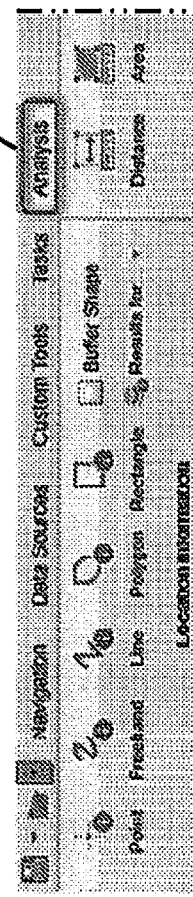
Figure 4E:
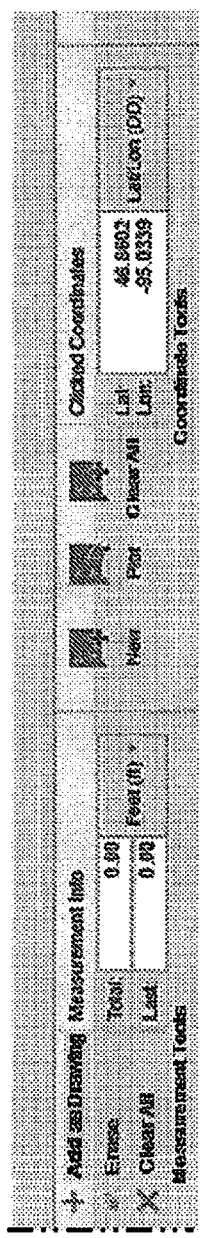
Figure 6:
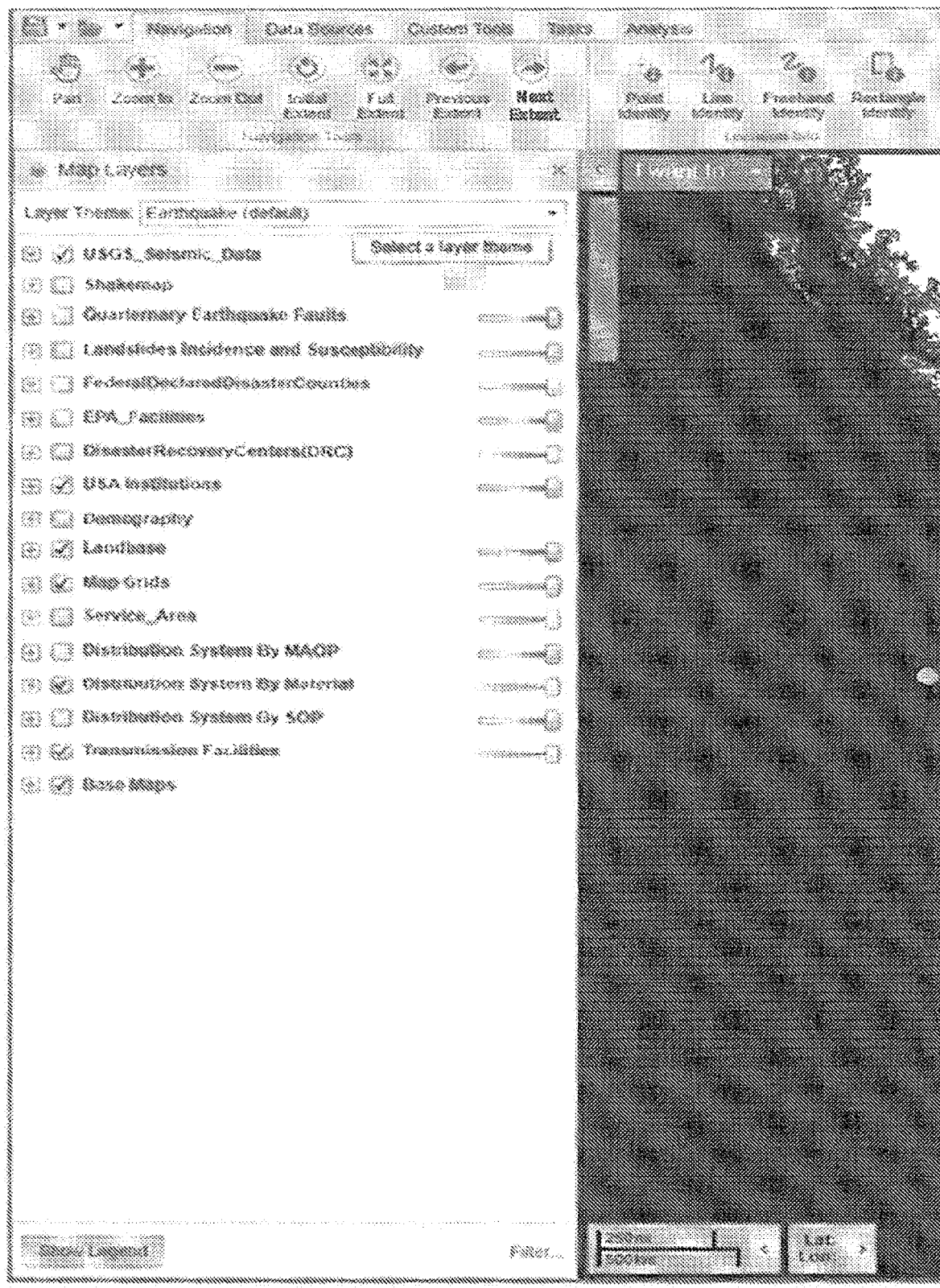
FIGS. 6 to 13 are partial screen shots of example map layers menus that allow a user to select layer themes and layer details.
Figure 6:
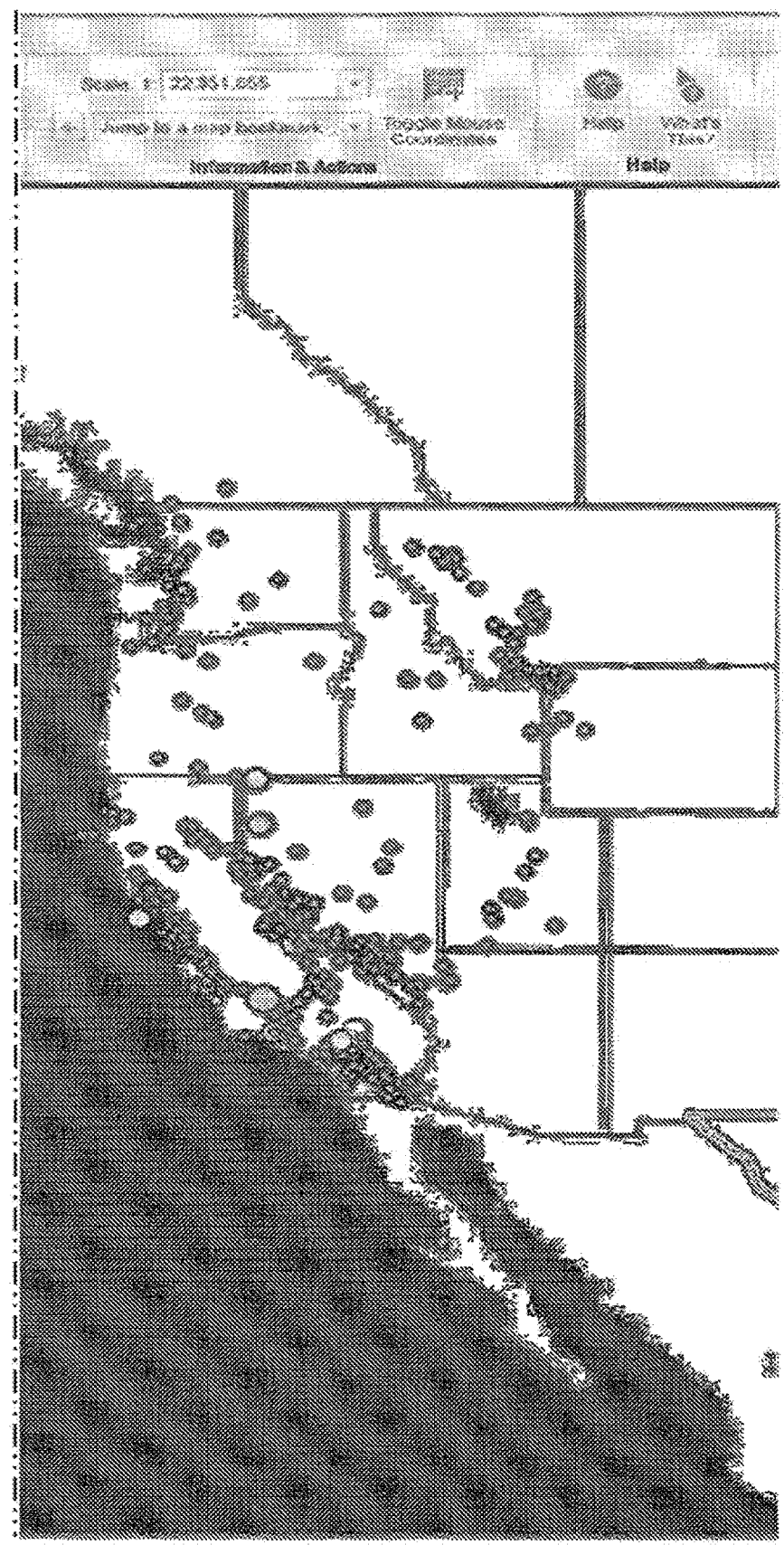
Figure 7:
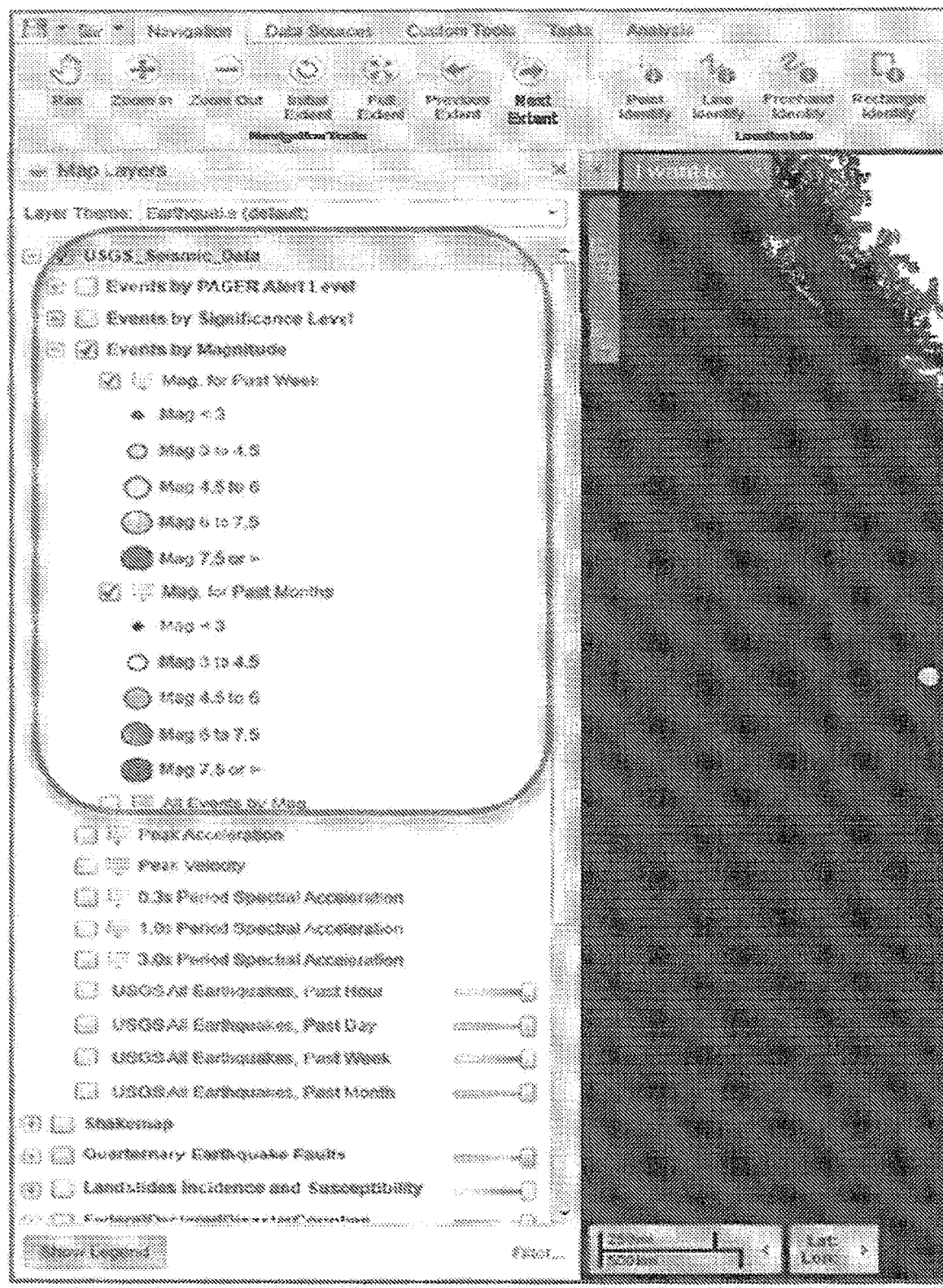
Figure 7:
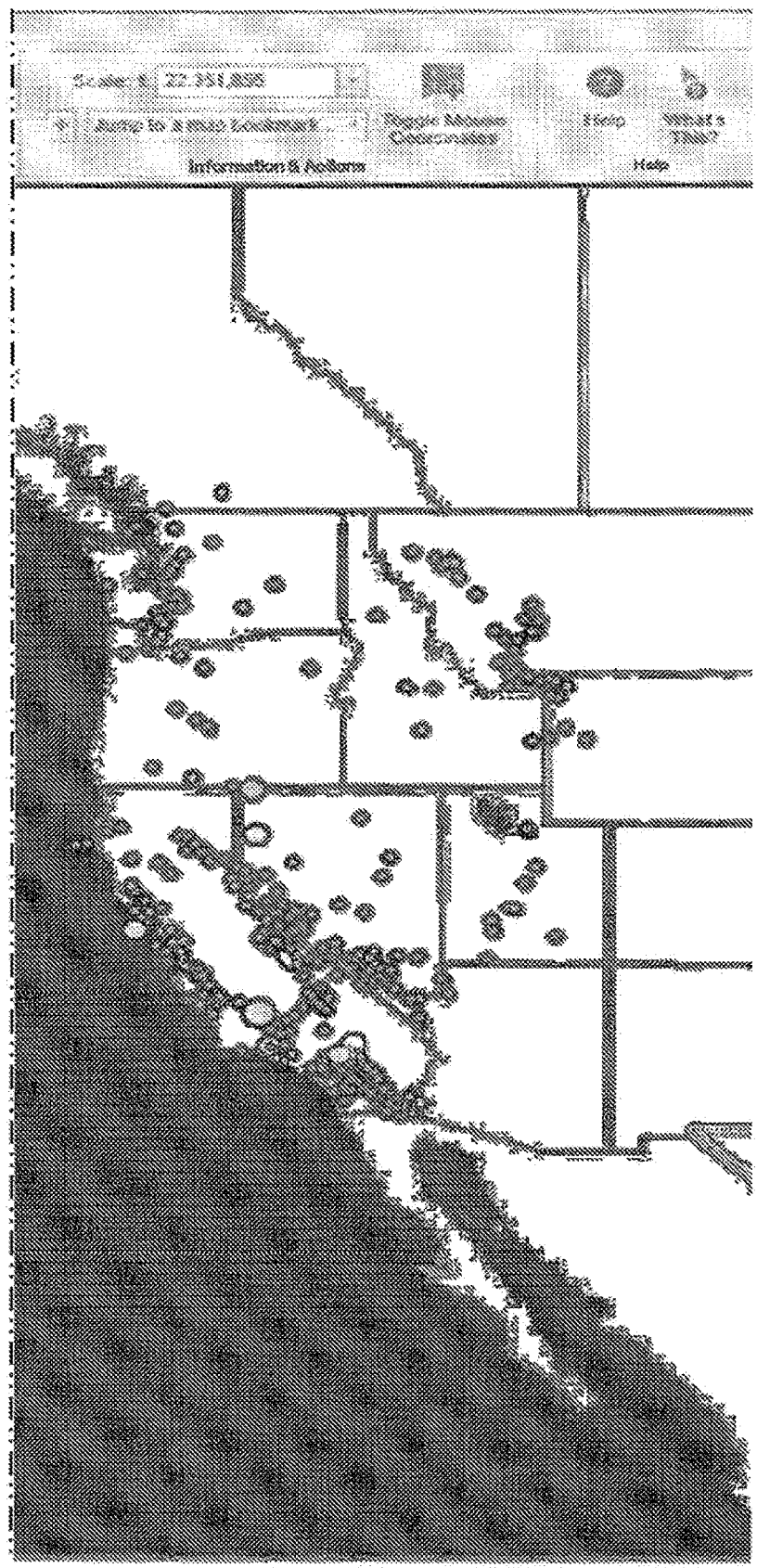
Figure 8:
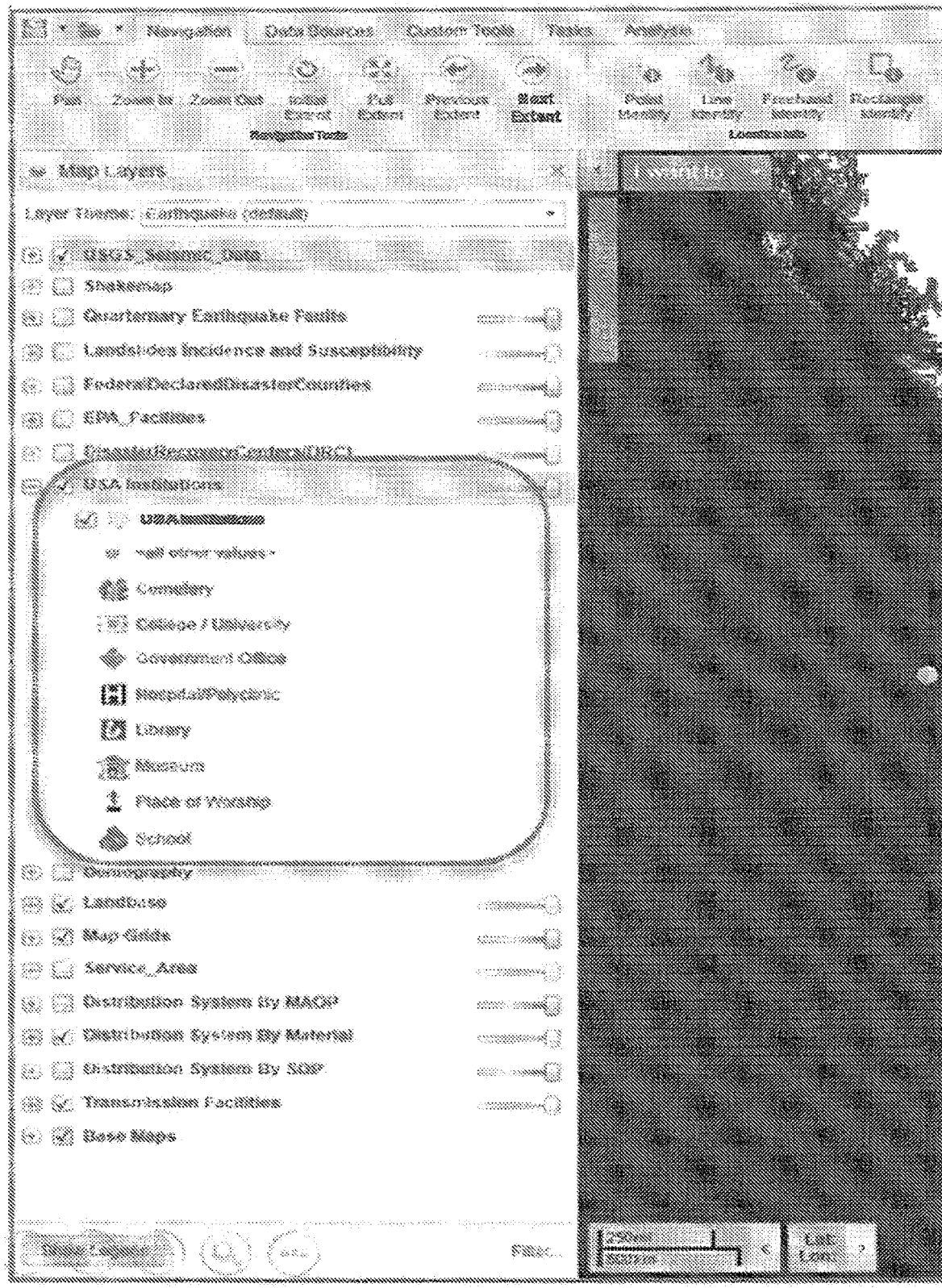
Figure 8:
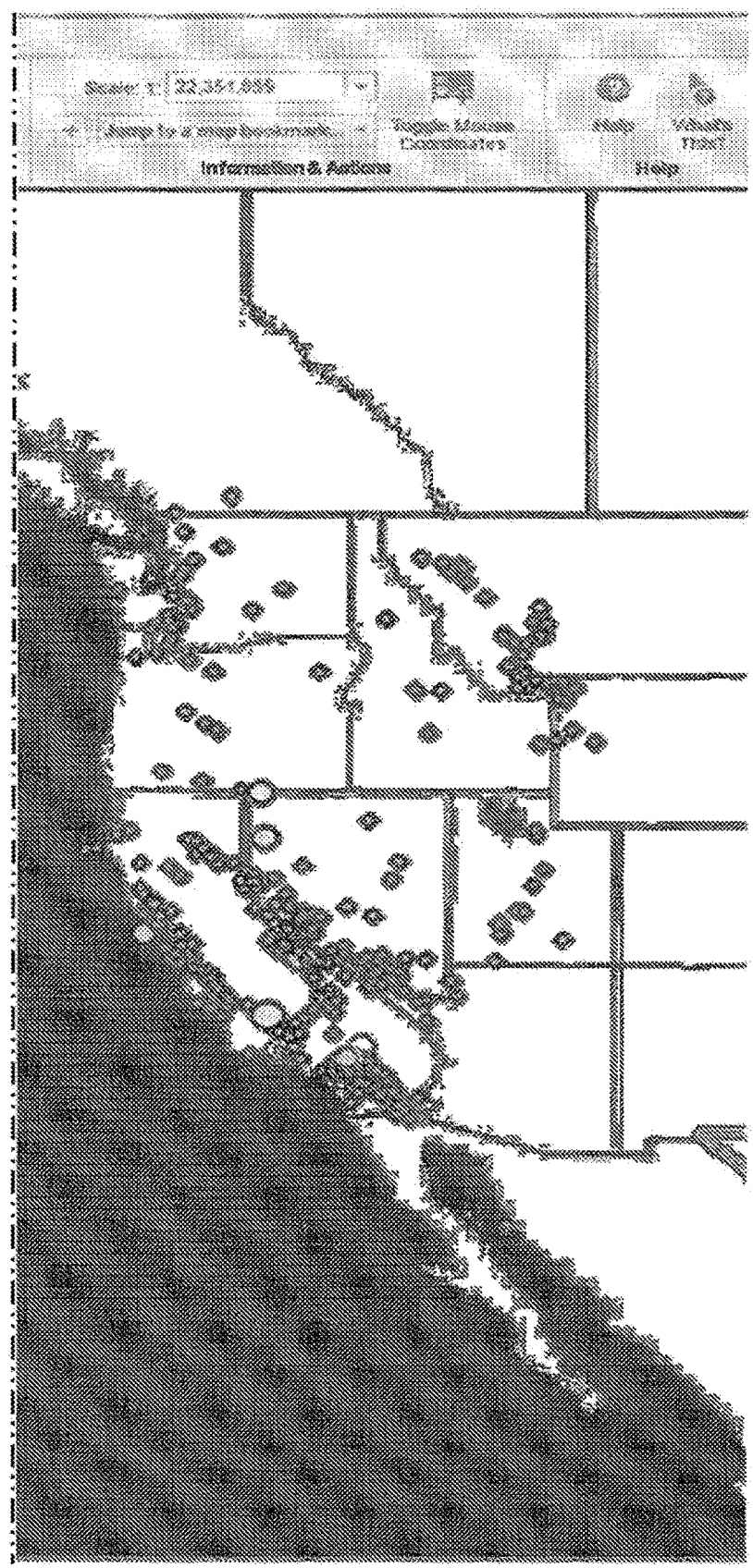
Figure 9:
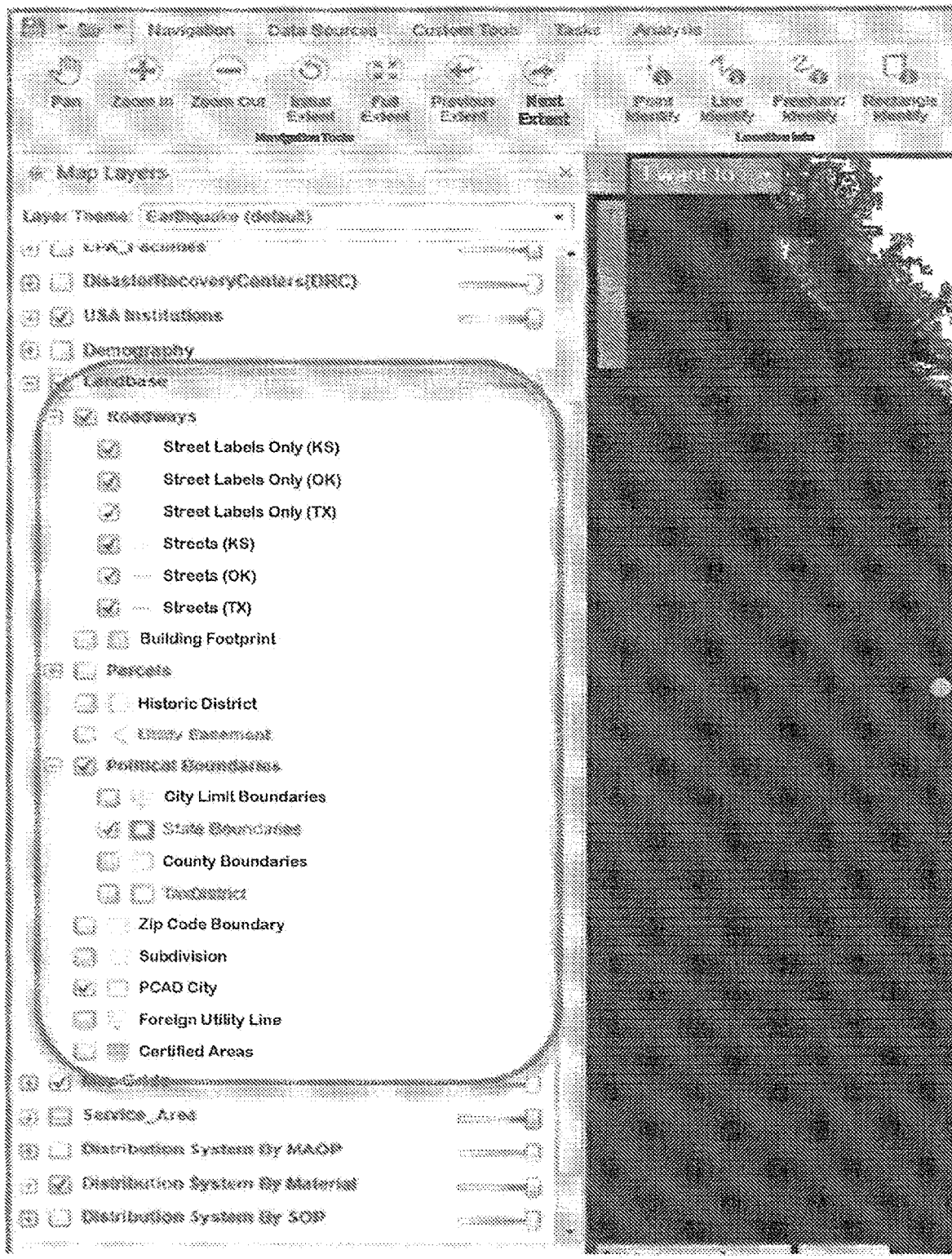
Figure 9:
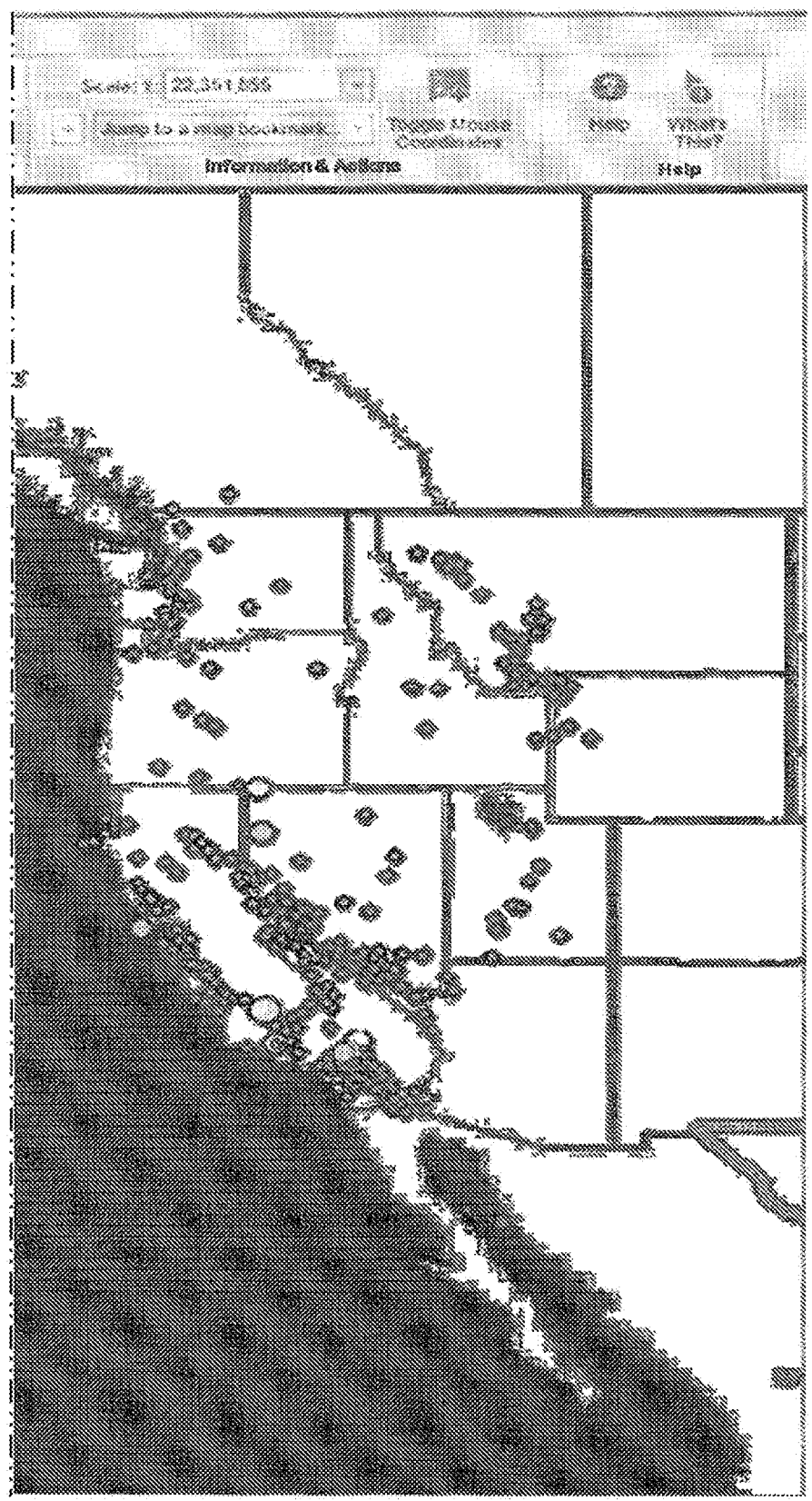
Figure 10:
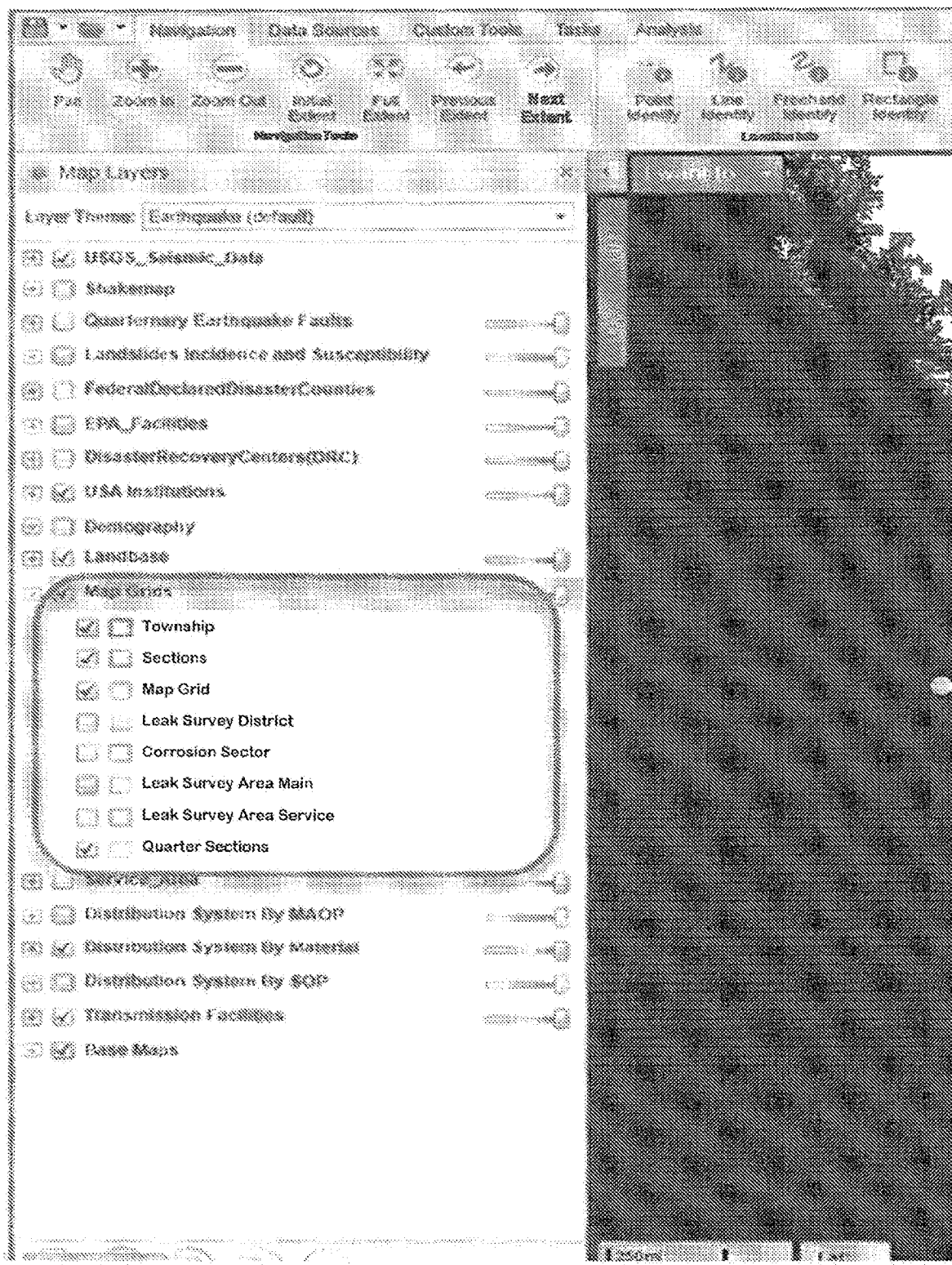
Figure 10:
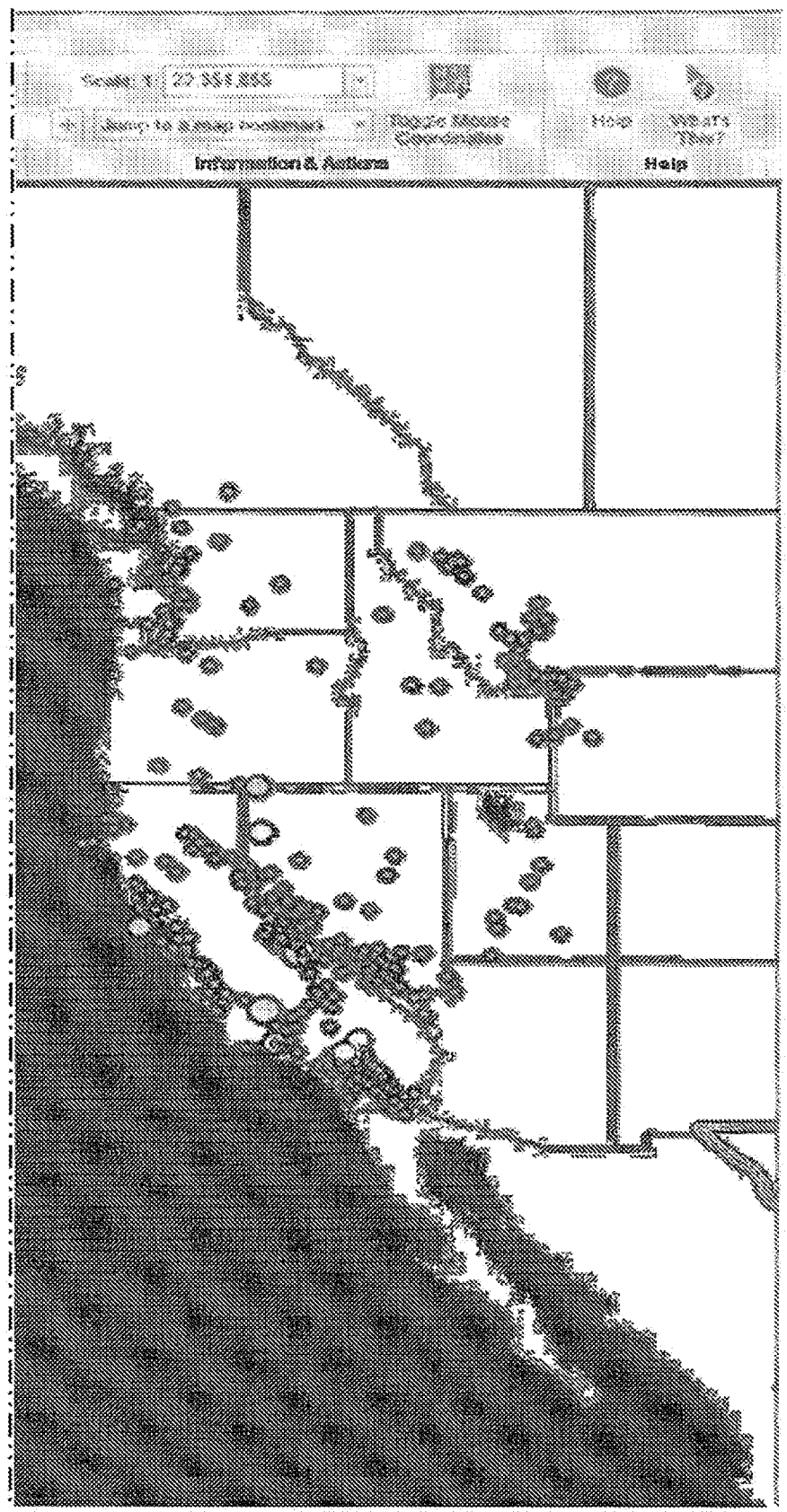
Figure 11:
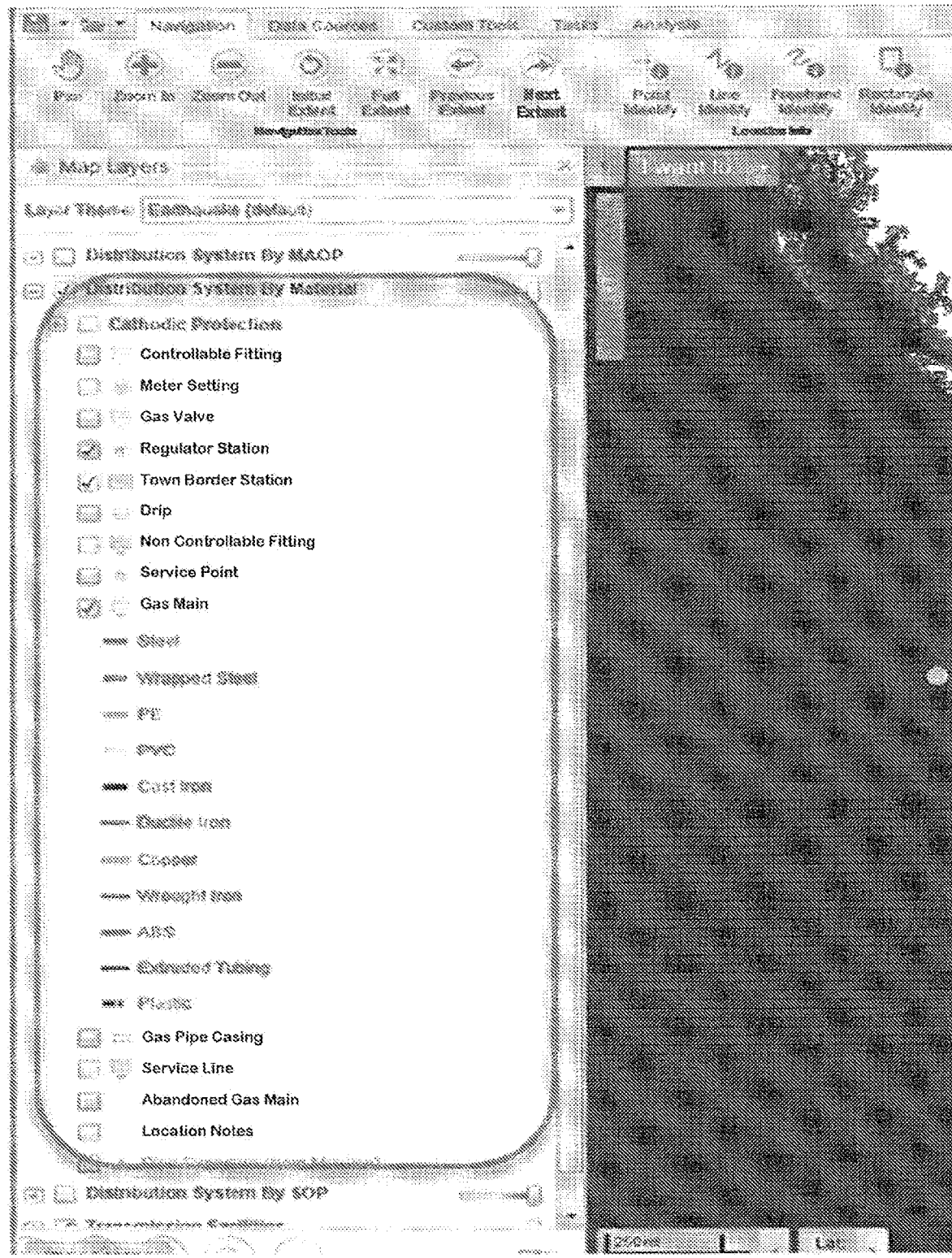
Figure 11:
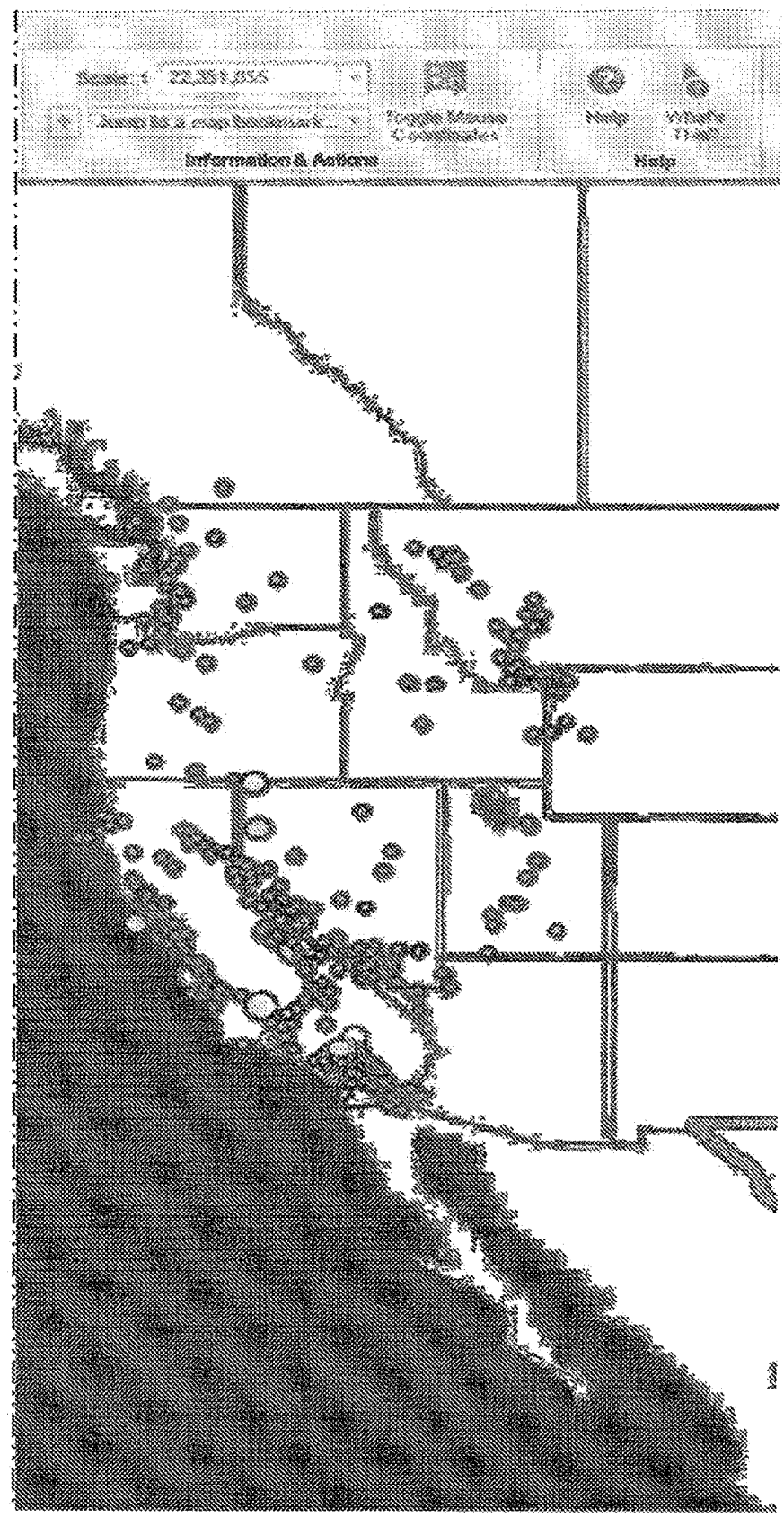
Figure 12:
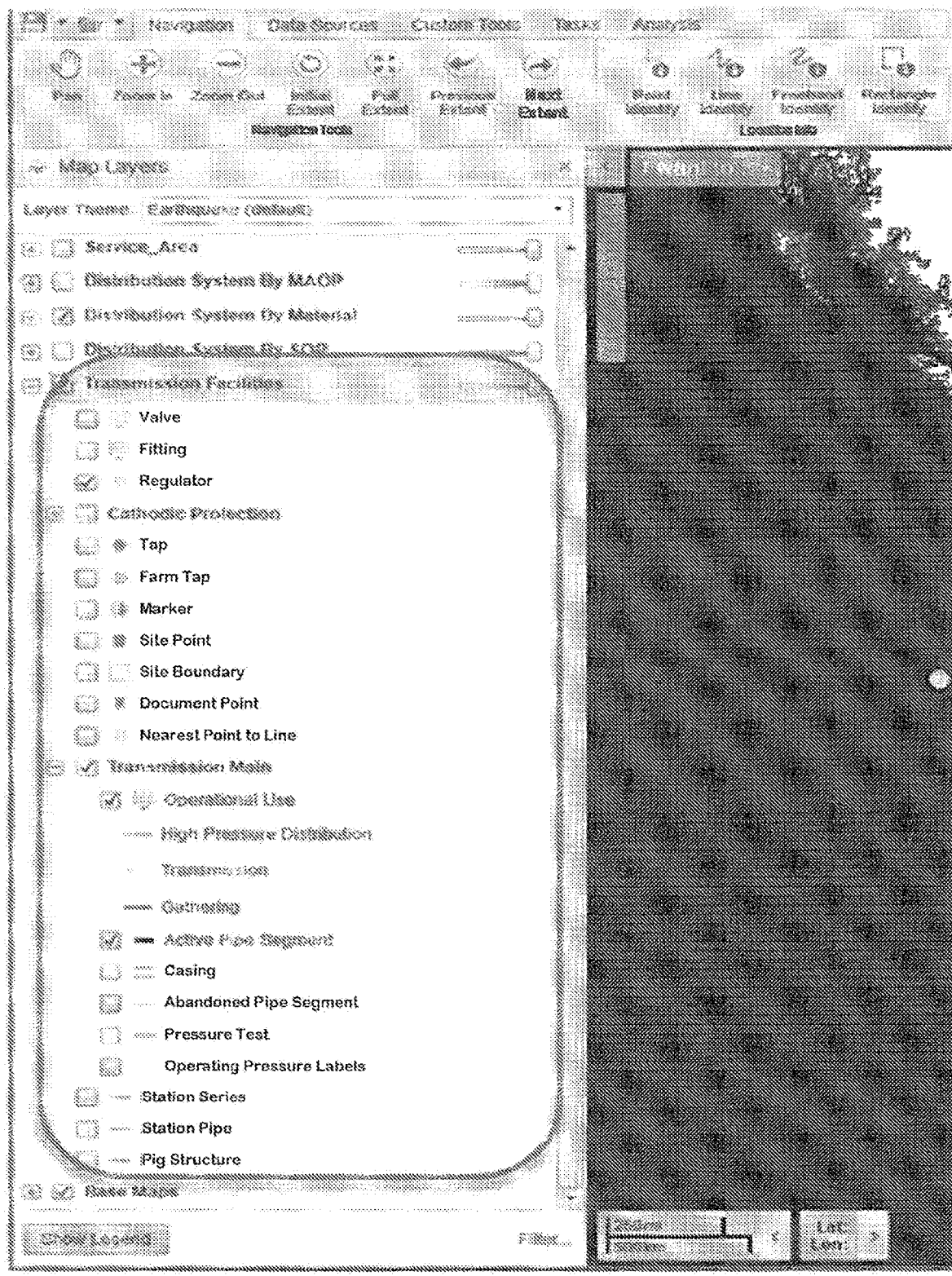
Figure 12:
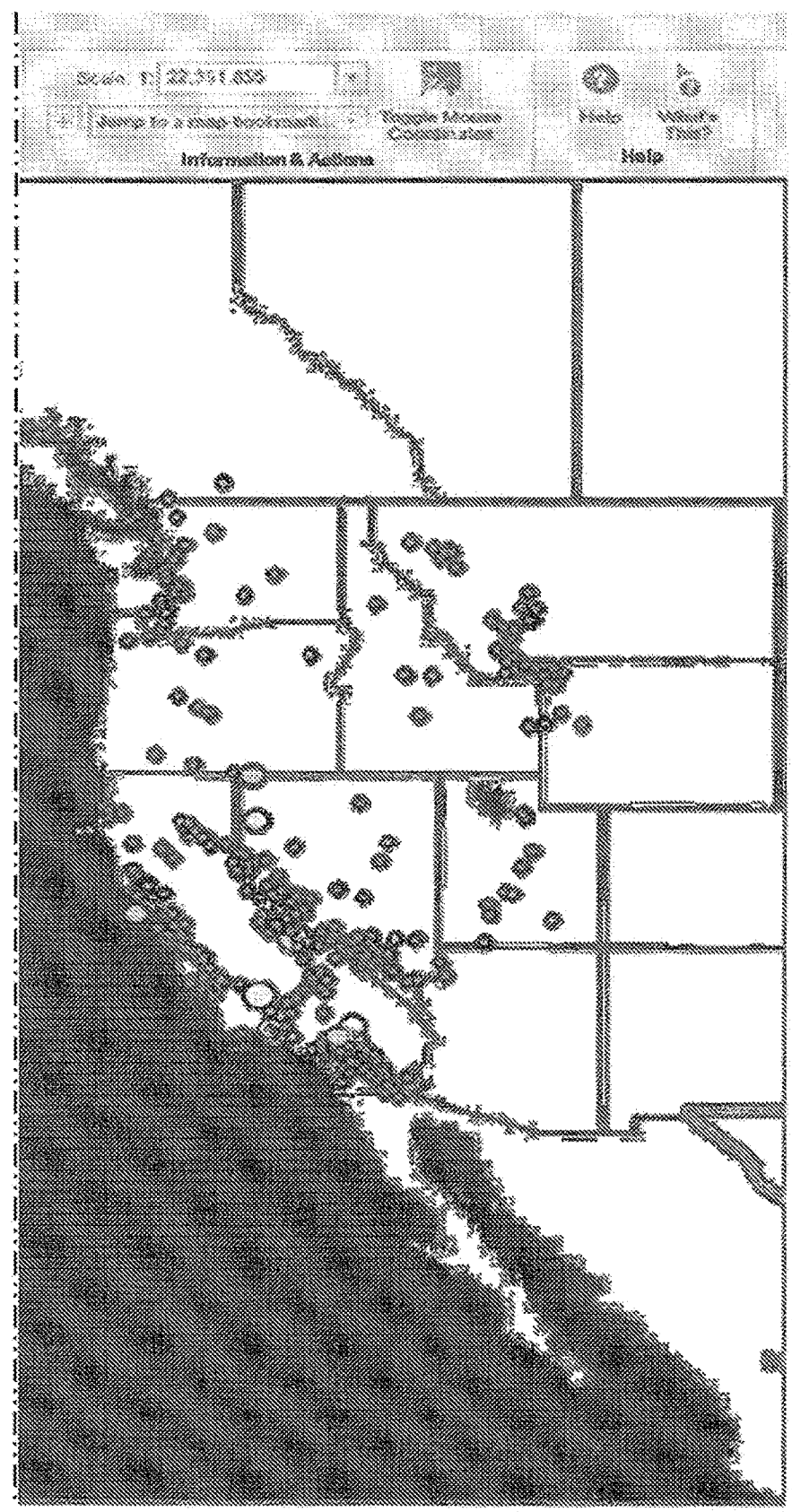
Figure 13:
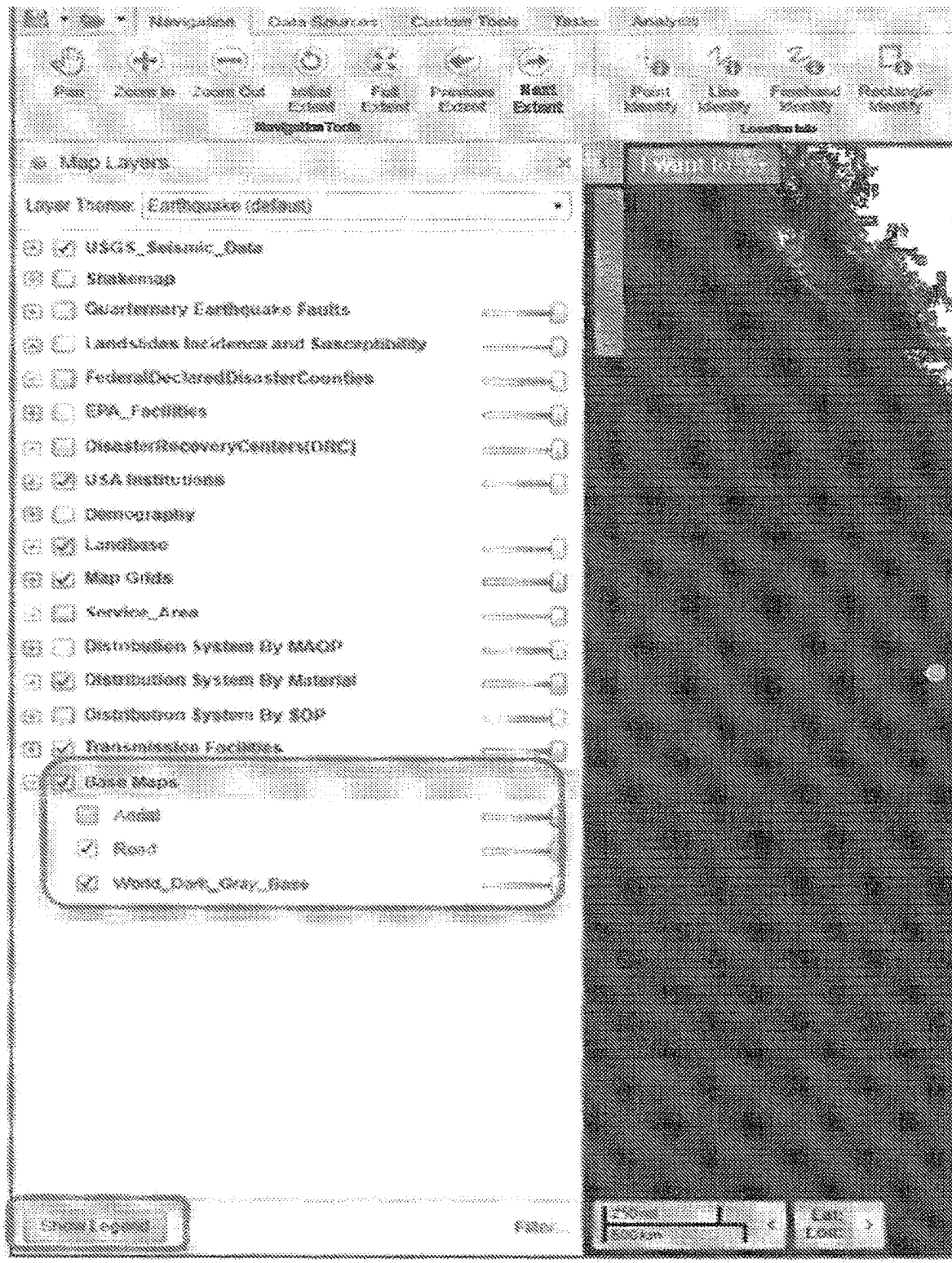
Figure 13:
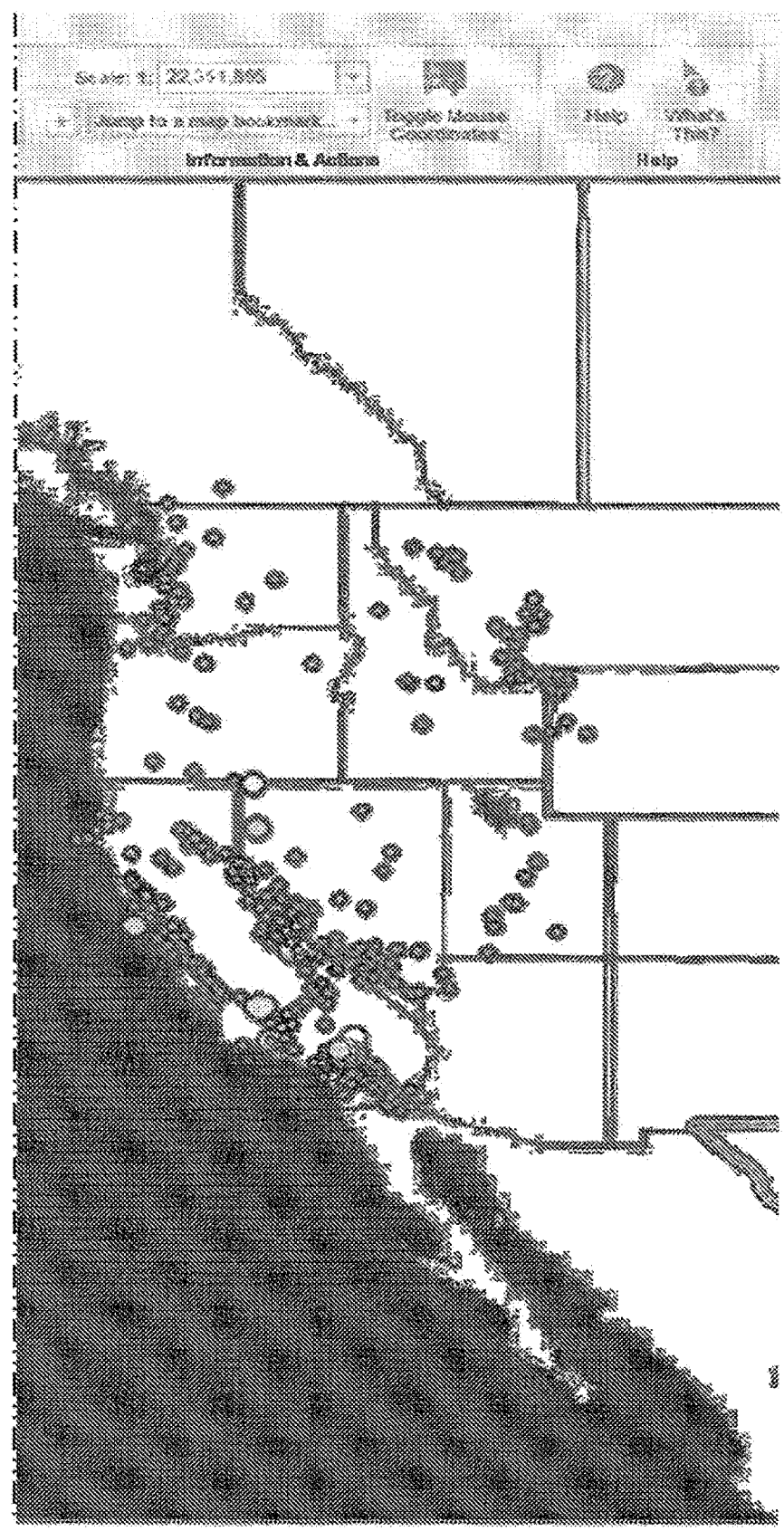
Figure 14:
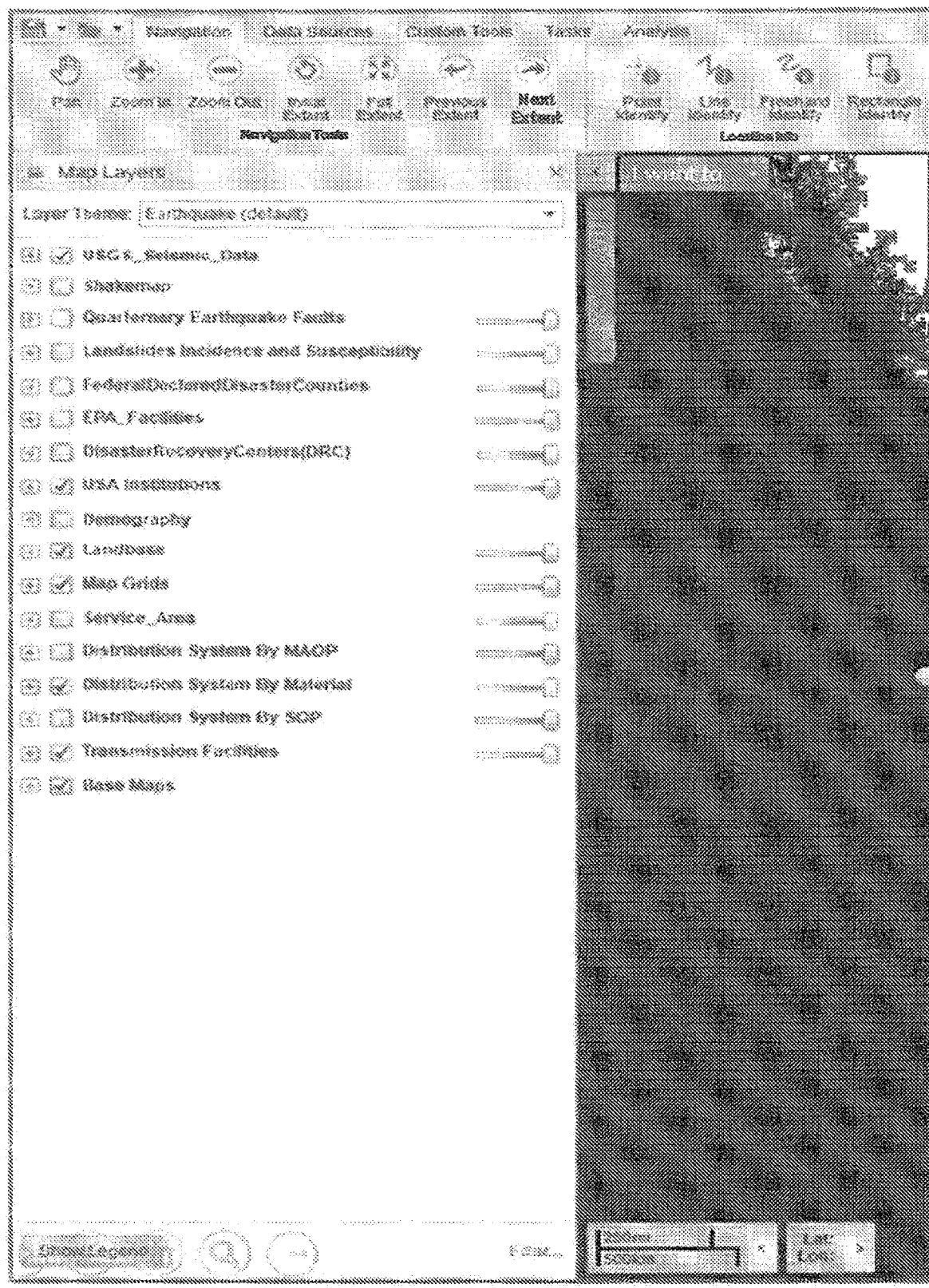
FIG. 14 is a screen shot of an embodiment of an example jump-to bookmarked geographical location menu.
Figure 14:
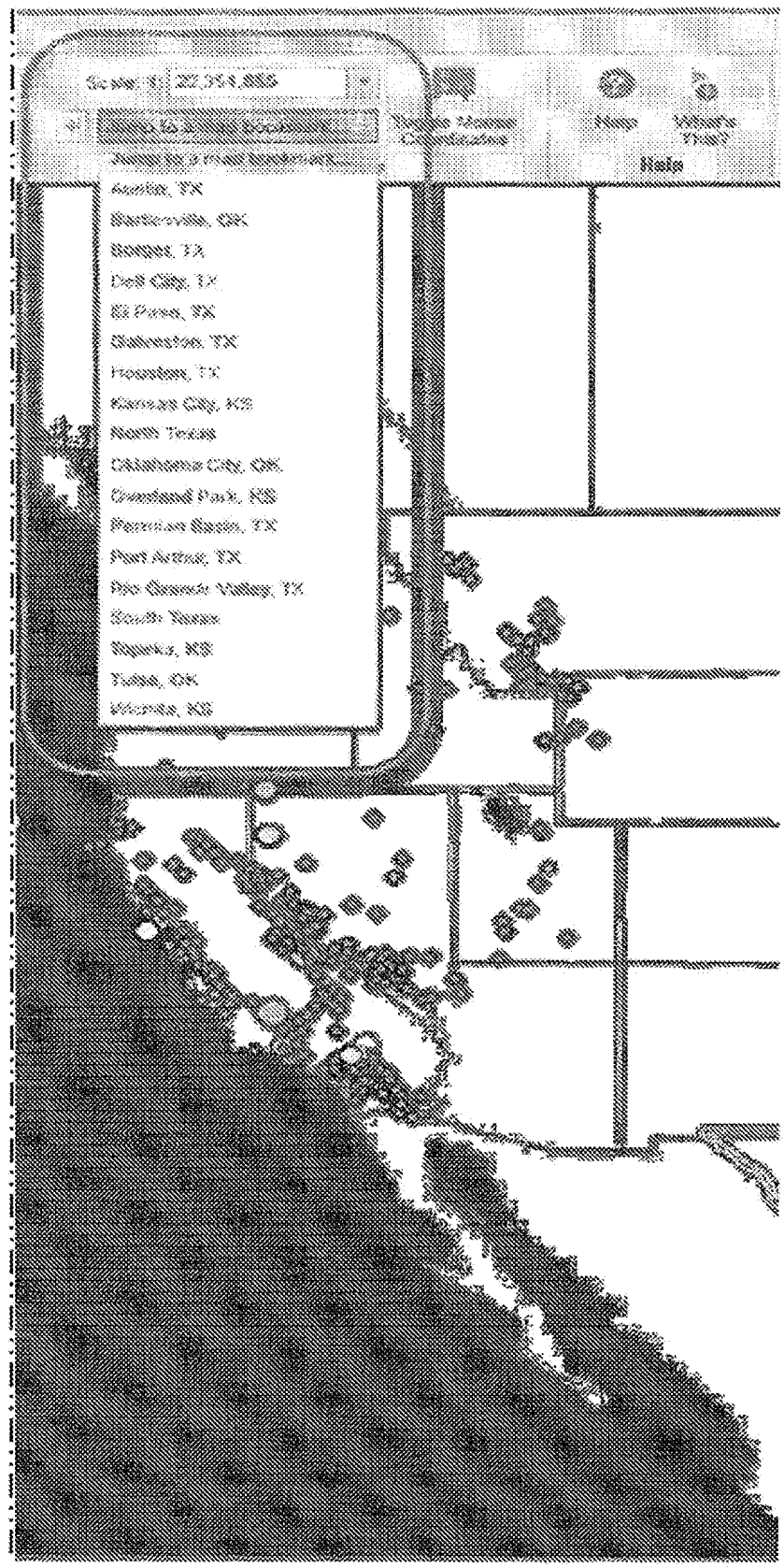
Figure 15:
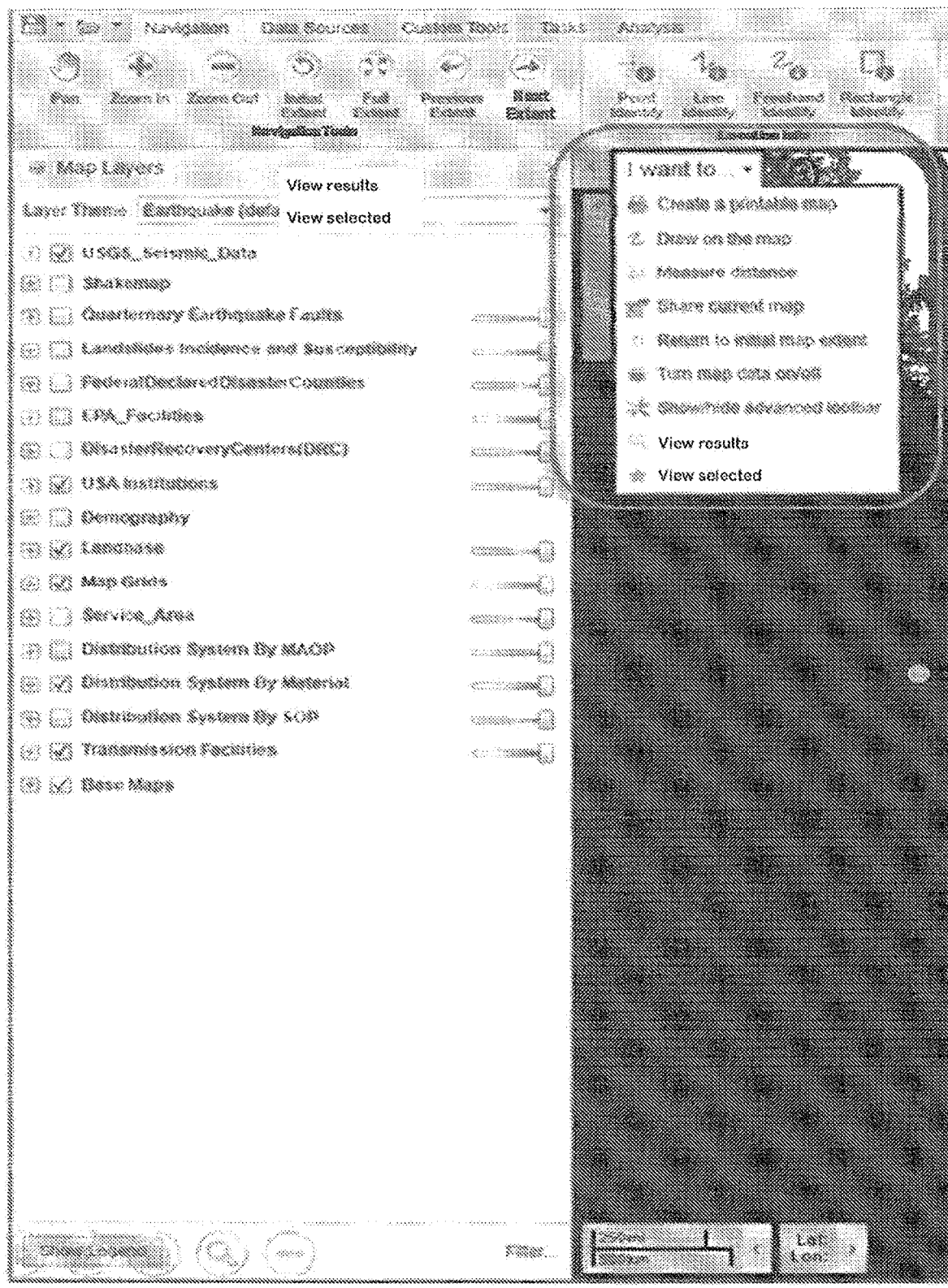
FIG. 15 is a screen shot of an embodiment of an "I want to" menu.
Figure 15:
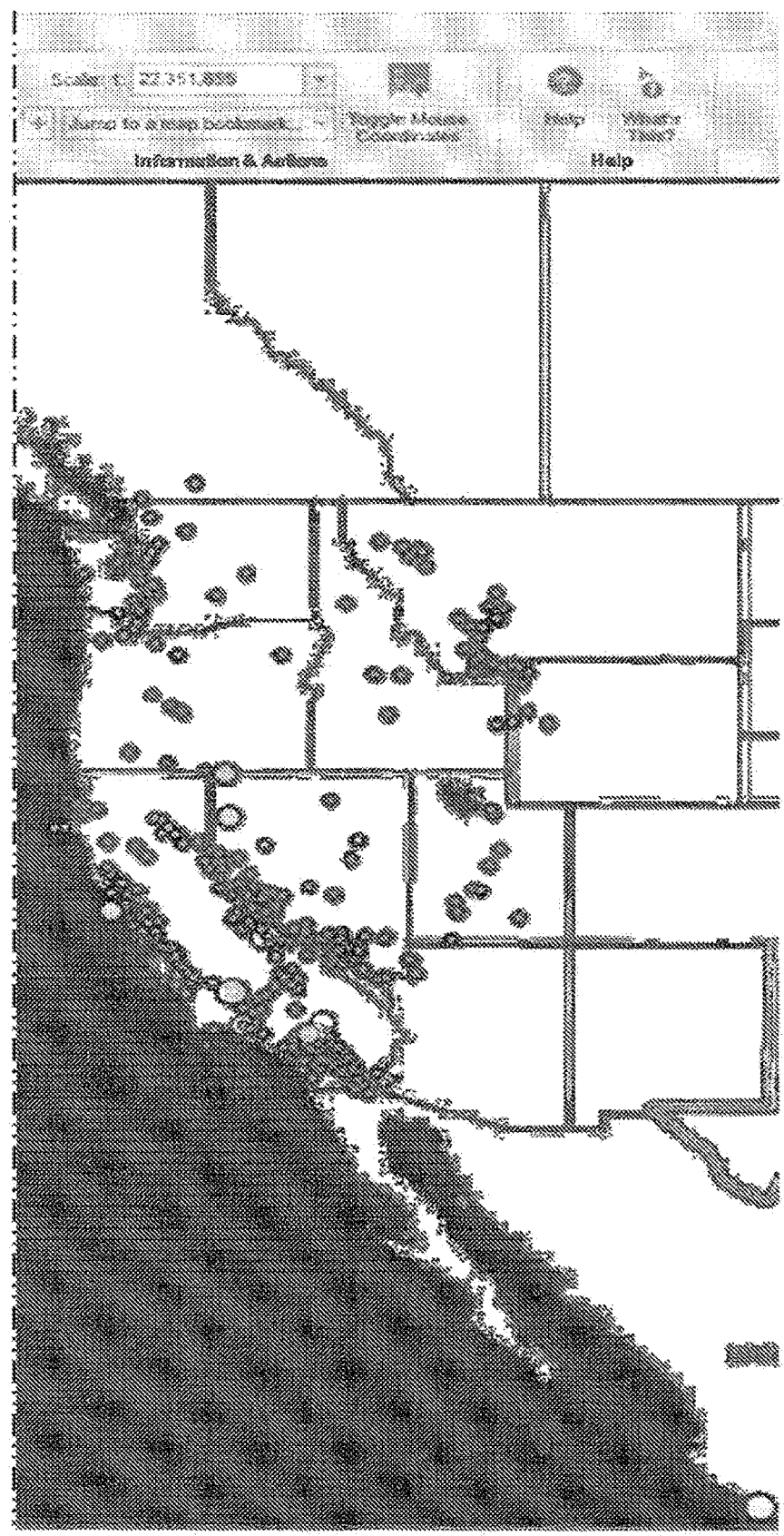
Figure 16:
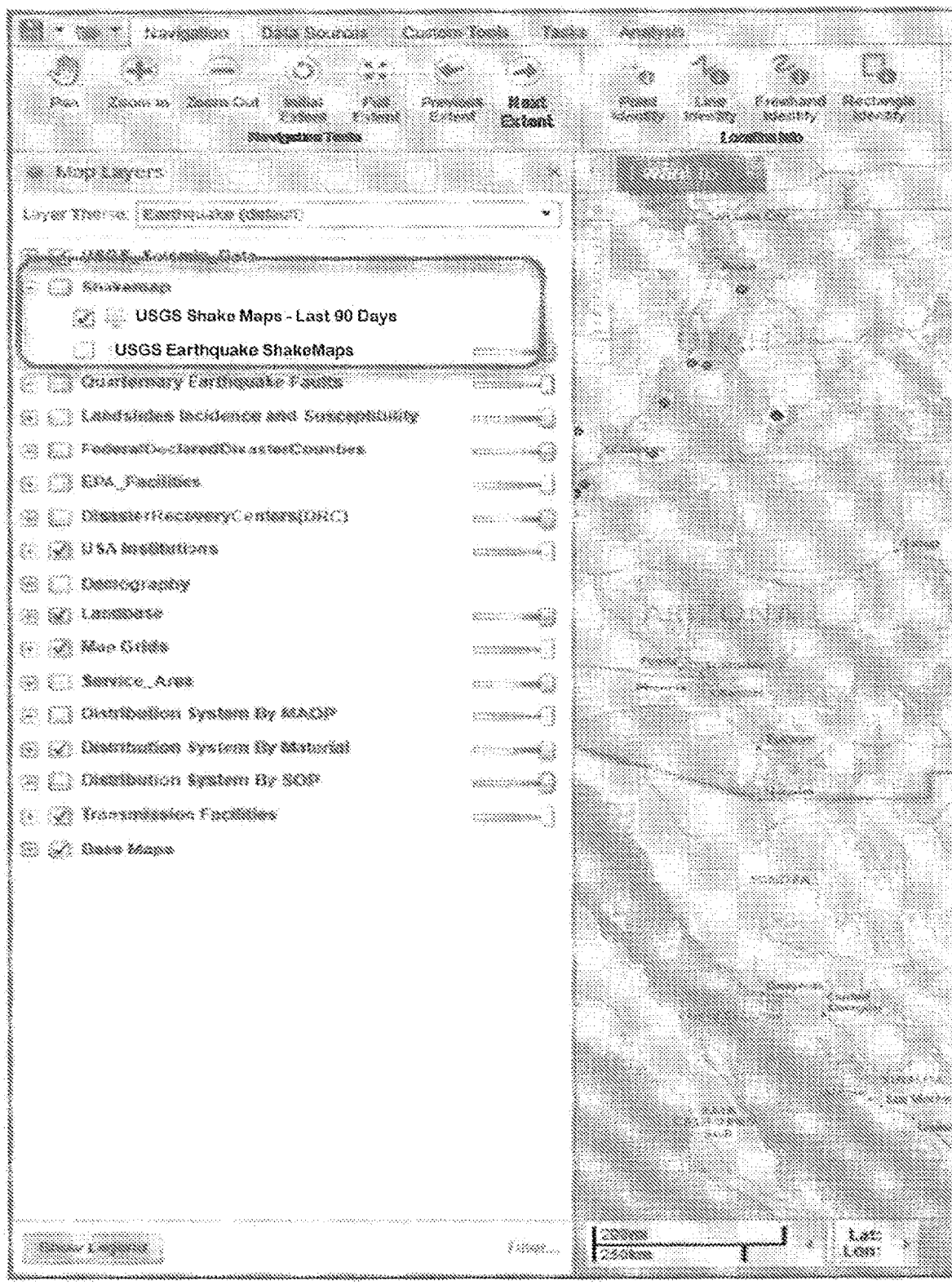
FIG. 16 is a screen shot of an embodiment of a shake map menu and presentation of shake locations.
Figure 16:
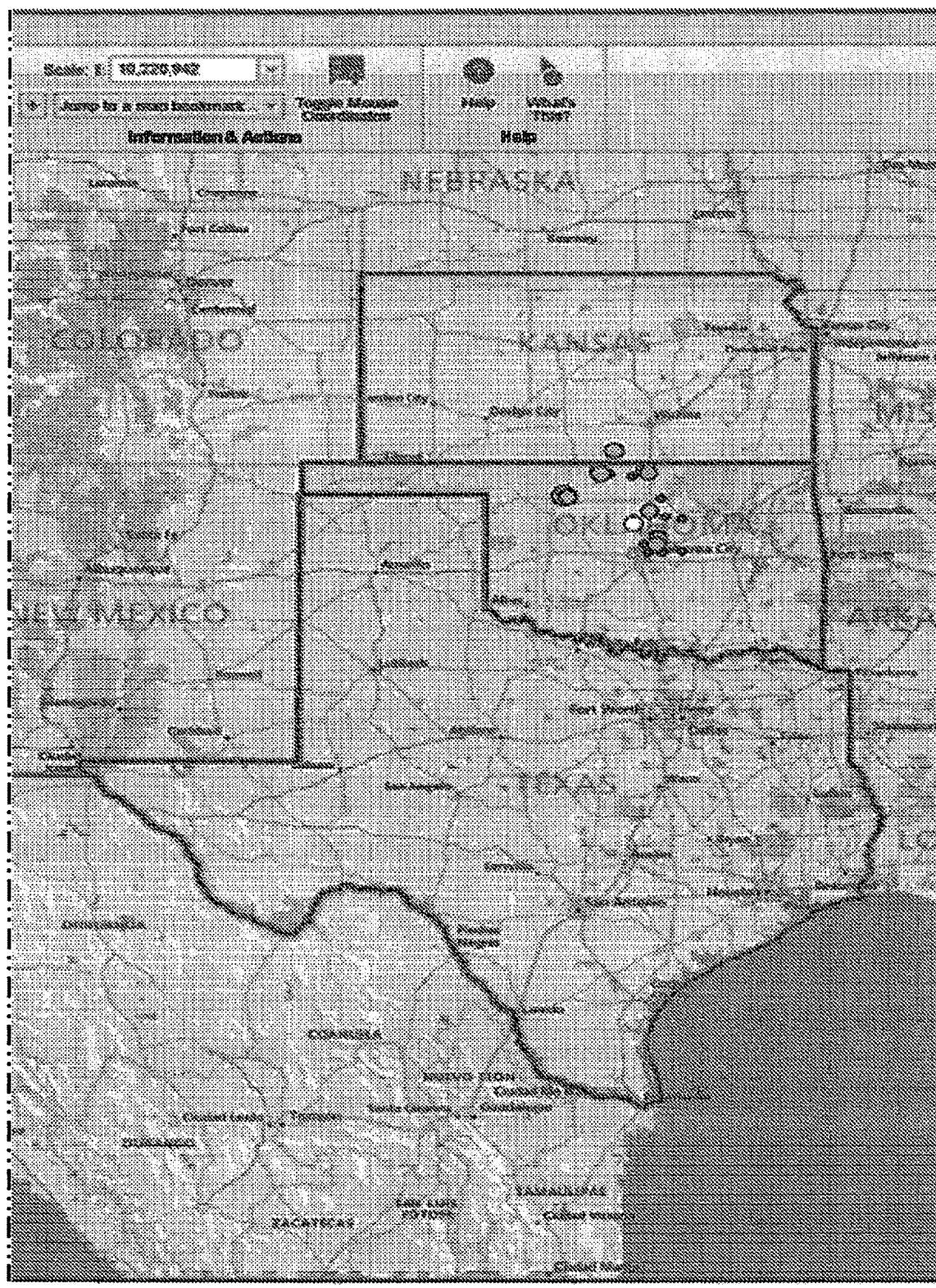
Figure 17:
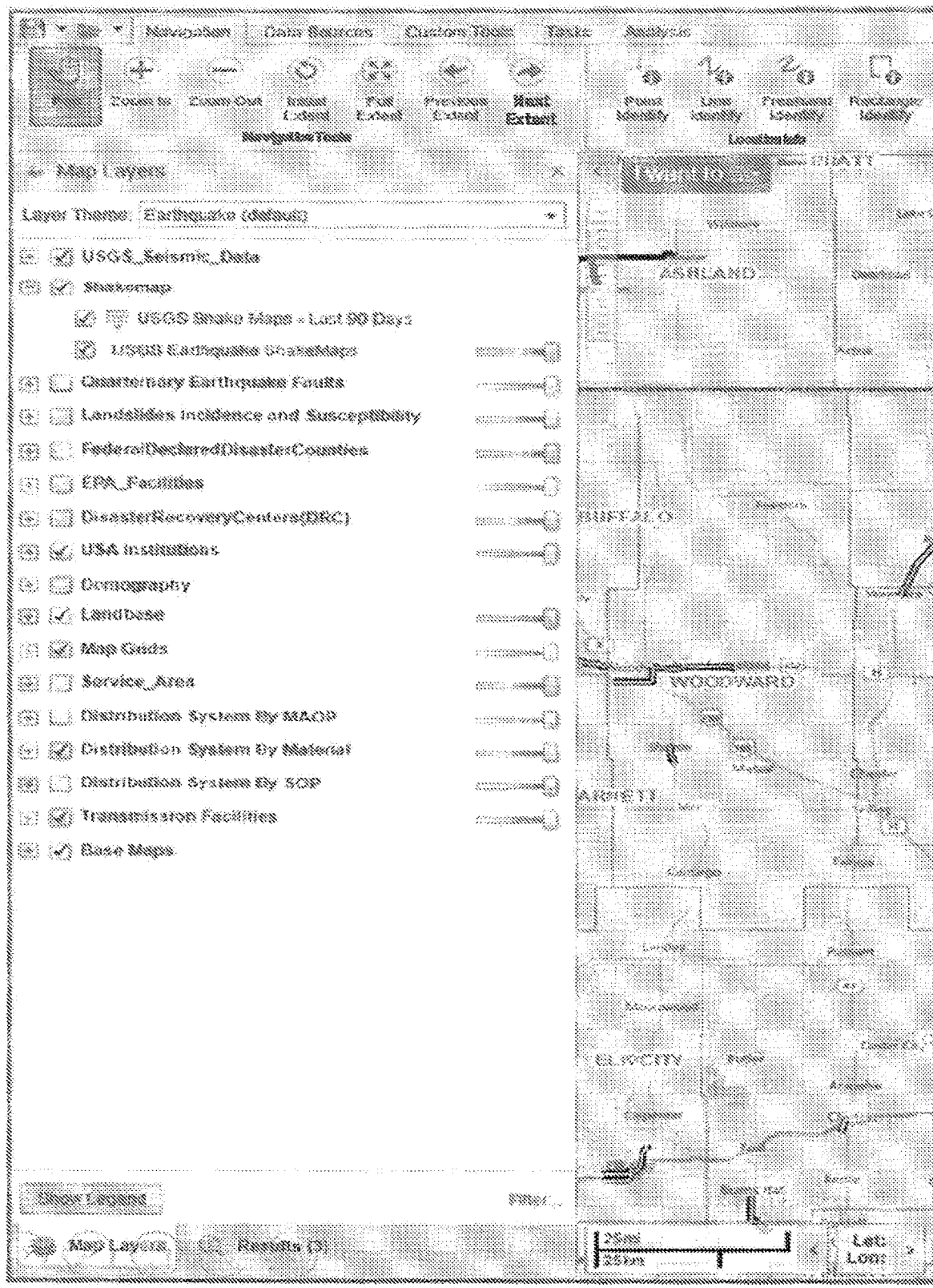
FIG. 17 is a screen shot of an enlarged, panned view of a shake map.
Figure 17:
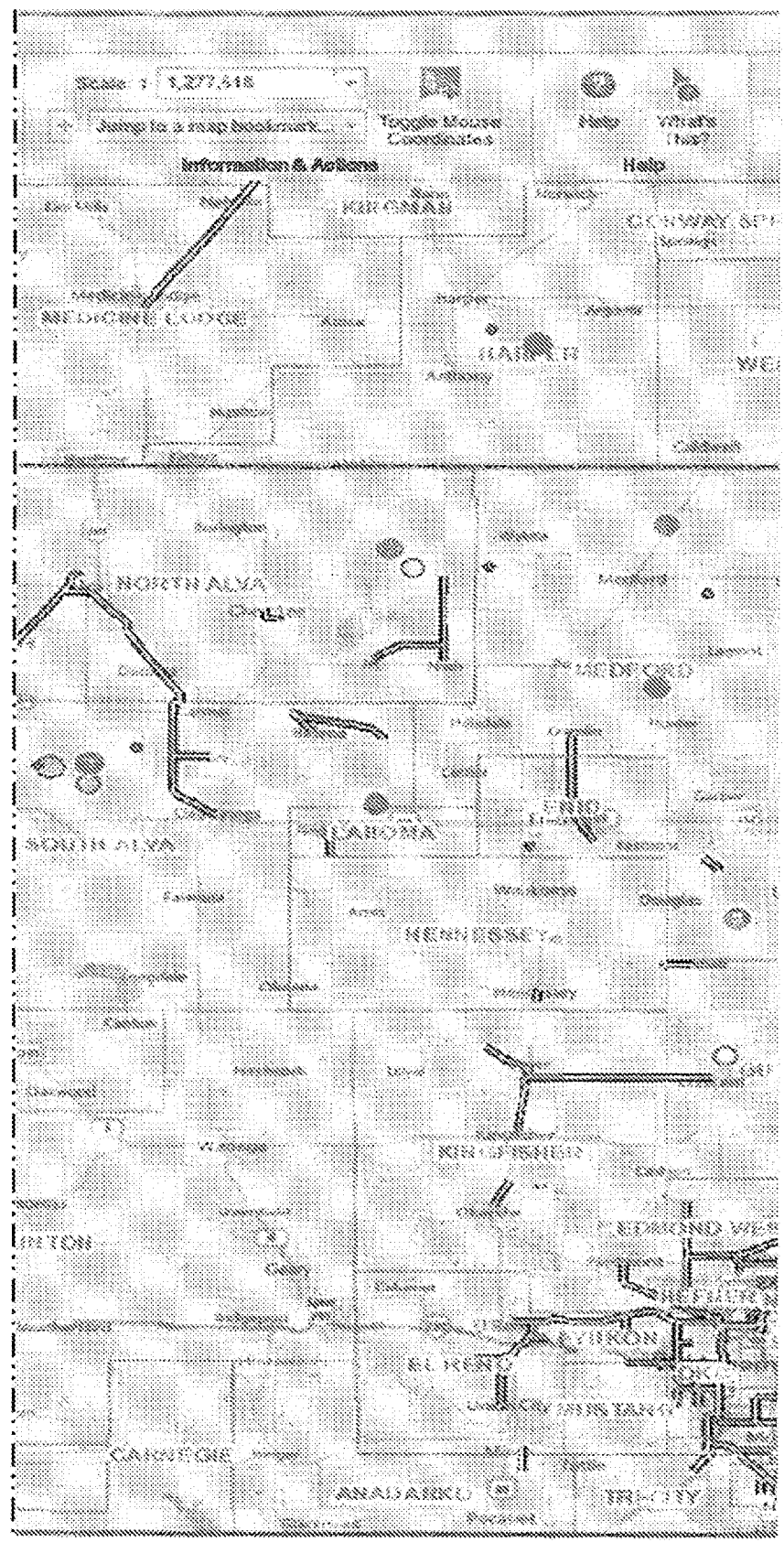

To accomplish the above, system 10 queries near real-time data provided by the U.S. Geological Survey (USGS) database 20 and couples this data to the company's pipeline mapping system database 30. Where appropriate, other publicly available or otherwise accessible physical infrastructure databases. Based upon a matching of the pipeline mapping data and the severity or potential damage intensity of the seismic event (see e.g. FIG. 3), the notification module 45 sends notifications to predetermined personnel such as a leak survey team.

Once notified, leak survey team personnel use the application modules 55 to view one or more maps M of any area "A" within the service territory T. Map M includes an earthquake layer 25A and one or more physical infrastructure layers 35A-35E. For example, a distribution system layer 35D and 35F can be displayed that shows, by material and age, the locations of various pipelines.

Earthquake layer 25A may be based on information gathered from some combination of the USGS SHAKEMAP®, peak ground acceleration ("PGA") data, peak ground velocity ("PGV") data, or their equivalents. The layer 25A includes an indication of the absolute or relative magnitude of the event throughout the territory T. For example, a quake velocity map "V" may be displayed with measured bands of waves displayed at intervals moving outward from the seismic epicenter. Blasting standard equivalents can be applied to create the velocity map V. The outer band may be a ground velocity measuring 5 cm/sec or about 2 in/sec. Determining a general measurement in feet or miles from the epicenter to one of the bands of acceleration yields a polygon-shaped buffer zone that can be used as a base area for seismic event assessment.

A ribbon menu 57 permits the user to select application modules 55A-55E in order to customize the map M by adding additional layers 25 or 35 or by drawing on the map M (see e.g. FIGS. 4A-4E). The user also can jump to preset (bookmarked) territory maps, pan or zoom, link to external maps, analyze distances or results, or perform other tasks such as printing and report writing.

Response actions can be provided based upon a set of predetermined rules (see e.g. FIG. 5). Other activities may be deployed for any magnitude category based on sound judgment and knowledge of potentially impacted company facilities and/or the findings of initial activities. Engineering and operations management can use the compiled information to identify structures that are the highest risk of damage from ground movement.

Similar scenarios apply for other types of natural hazard events, with one or more layers 25A-25D or subsets of these layers, see e.g. FIGS. 6-17, being selected and overlaid on one or more physical infrastructure layers 35A-35G (or subsets of these layers).

The invention claimed is:

1. A system for prioritizing leak surveys of one or more pipeline runs and facilities associated with an underground natural gas distribution pipeline potentially impacted by a seismic event, the system comprising:
at least one computing device including a microprocessor and associated software in communication with a network, the at least one computing device including a graphical user interface, the associated software adapted to:
transform ground velocity data of a seismic event occurring within a selected service territory defined by a user into a quake velocity map and store the quake velocity map as a quake velocity map layer, the transform including applying a blasting standard, the quake velocity map including relational spatial data corresponding to the blasting standard;
retrieve, from a pipeline mapping system database, locations of the one or more pipeline runs and pipeline facilities lying at least partially within the selected service territory and store the locations as pipeline map layer;
display on the graphical user interface of the at least one computing device a map of the selected service territory, the map including the quake velocity map layer and the pipeline map layer, the quake velocity map layer having a first shading or first color, the pipeline map layer having a second shading or second color different than that of the first shading or first color, each map layer being visible when overlaid on one another;
permit the user to define a spatial polygonal area of interest on the map;
send a first notice to at least one mobile computing device in communication with the network if a first portion of the one or more pipeline runs and pipeline facilities falls within the user-defined spatial polygonal-shaped area of interest on the map and the relational spatial data in proximity to the first portion represents a ground velocity of less than 5 cm/sec;
send a second notice different from the first notice if a second portion of the one or more pipeline runs and facilities is contained within another user-defined spatial polygonal-shaped area of interest on the map and the spatial relational data in proximity to the second portion represents a ground velocity of at least 5 cm/sec.

2. The system of claim 1, further comprising the associated software adapted to:
retrieve, from a non-utility structures database, locations of non-utility structures located within the selected service territory, and store the locations of non-utility structures as a non-utility structures map layer; and
display on the map virtual representations of the non-utility services structures.

3. The system of claim 1, wherein, the first shading or first color includes a gradient.

4. The system of claim 1, further comprising the associated software adapted to
display on the graphical user interface a prioritized list of the one or more pipeline runs and pipeline facilities to be inspected within the another spatial polygonal-shaped area of interest.

5. The system of claim 4, further comprising, the associated software including predetermined rules when generating the prioritized list, wherein one of the predetermined rules includes a likelihood of damage and another of the predetermined rules includes a consequence severity corresponding to public health, public safety, or public health and safety.

6. The system of claim 5, wherein, the prioritized list is updated as inspections are performed.

7. Non-transitory machine readable storage medium containing instructions thereon for prioritizing leak surveys of one or more pipeline runs and facilities associated with an underground natural gas distribution pipeline potentially impacted by a seismic event, the instructions when executed by a processor:
transform ground velocity data of a seismic event occurring within a selected service territory defined by a user into a quake velocity map and store the quake velocity map as a quake velocity map layer, the transform including applying a blasting standard, the quake velocity map including relational spatial data corresponding to the blasting standard;
retrieve, from a pipeline mapping system database, locations of the one or more pipeline runs and pipeline facilities lying at least partially within the selected service territory and store the locations as pipeline map layer;
display on a graphical user interface of at least one computing device a map of the selected service territory, the map including the quake velocity map layer and the pipeline map layer, the quake velocity map layer having a first shading or first color, the pipeline map layer having a second shading or second color different than that of the first shading or first color, each map layer being visible when overlaid on one another;
permit the user to define a spatial polygonal area of interest on the map;
send a first notice to at least one mobile computing device in communication with the network if a first portion of the one or more pipeline runs and pipeline facilities falls within the user-defined spatial polygonal-shaped area of interest on the map and the relational spatial data in proximity to the first portion represents a ground velocity of less than 5 cm/sec;
send a second notice different from the first notice if a second portion of the one or more pipeline runs and facilities is contained within another user-defined spatial polygonal-shaped area of interest on the map and the spatial relational data in proximity to the second portion represents a ground velocity of at least 5 cm/sec.

8. The instructions of claim 7, wherein the instructions:
retrieve, from a non-utility structures database, locations of non-utility structures located within the selected service territory, and store the locations of non-utility structures as a non-utility structures map layer; and
display on the map virtual representations of the non-utility services structures.

9. The instructions of claim 7, wherein, the first shading or first color includes a gradient.

10. The instructions of claim 7, wherein the instructions display on the graphical user interface a prioritized list of the one or more pipeline runs and pipeline facilities to be inspected within the another spatial polygonal-shaped area of interest.

11. The instructions of claim 10 further including predetermined rules when generating the prioritized list, wherein one of the predetermined rules includes a likelihood of damage and another of the predetermined rules includes a consequence severity corresponding to public health, public safety, or public health and safety.

12. The instructions of claim 10, wherein the prioritized list is updated as inspections are performed.

\* \* \* \* \*